United States Patent
König

(10) Patent No.: US 8,643,950 B2
(45) Date of Patent: Feb. 4, 2014

(54) LENS-BASED IMAGE AUGMENTING OPTICAL WINDOW WITH INTERMEDIATE REAL IMAGE

(75) Inventor: Jens König, Bochum (DE)

(73) Assignee: BlackBerry Limited, Waterloo Ontario (CA)

( * ) Notice: Subject to any disclaimer, the term of this patent is extended or adjusted under 35 U.S.C. 154(b) by 0 days.

(21) Appl. No.: 13/421,348

(22) Filed: Mar. 15, 2012

(65) Prior Publication Data

US 2013/0242402 A1    Sep. 19, 2013

(51) Int. Cl.
G02B 27/14       (2006.01)

(52) U.S. Cl.
USPC ....................................................... 359/630

(58) Field of Classification Search
USPC .......... 345/7–9, 632, 633; 359/443, 454, 455, 359/458, 459, 462–477, 609, 618, 619, 359/621–624, 629–640, 652–655
See application file for complete search history.

(56) References Cited

U.S. PATENT DOCUMENTS

| 3,281,712 | A | 7/1962 | Koester |
| 3,286,193 | A | 7/1962 | Koester |
| 4,297,022 | A | 10/1981 | Lester |
| 5,650,876 | A | 7/1997 | Davies et al. |
| 5,680,186 | A | 10/1997 | Watanabe et al. |
| 5,703,717 | A | 12/1997 | Ezra et al. |
| 5,796,522 | A | 8/1998 | Meyers |
| 5,822,125 | A | 10/1998 | Meyers |
| 5,886,822 | A | 3/1999 | Spitzer |
| 6,072,627 | A | 6/2000 | Nomura et al. |
| 6,381,072 | B1 | 4/2002 | Burger |
| 7,486,854 | B2 | 2/2009 | Van Ostrand et al. |
| 7,796,316 | B2 | 9/2010 | Bodkin |
| 8,000,015 | B2 | 8/2011 | Yamamura |
| 2004/0263964 | A1* | 12/2004 | Okano et al. .................. 359/443 |

(Continued)

FOREIGN PATENT DOCUMENTS

| EP | 0651273 | 5/1995 |
| WO | 03005733 | 1/2003 |

OTHER PUBLICATIONS

EESR dated Aug. 22, 2012 for EP 12159744.
EESR dated Aug. 21, 2012 for EP 12159743.

(Continued)

*Primary Examiner* — Scott J Sugarman
*Assistant Examiner* — Gary O'Neill
(74) *Attorney, Agent, or Firm* — Jeffrey N. Giunta; Fleit Gibbons Gutman Bongini & Bianco PL

(57) ABSTRACT

An image augmenting window and method of operation. An image augmenting window has at least one selectably transmissive internally focused intermediate image lens with a first and rear side opposite one another. Each lens respectively has a first portion that receives light and focuses it into a focused image on an internal focal plane. Each lens also has a projecting output optical structure that refracts the focused image as a projected image exiting the rear side at an exit angle. A selectably transmissive shutter is located in the internal focal plane and is controllable to block at least a portion of light passing through the lens. At least one controllable light source, positioned adjacent to a lateral side of a respective selectably transmissive internally focused intermediate image lens, emits projected light parallel to the exit angle. A controller independently controls each shutter and each controllable light source.

20 Claims, 14 Drawing Sheets

(56) References Cited

U.S. PATENT DOCUMENTS

| | | | |
|---|---|---|---|
| 2005/0024731 A1 | 2/2005 | Mitchell et al. | |
| 2005/0162748 A1* | 7/2005 | Spruck et al. | 359/630 |
| 2006/0110090 A1 | 5/2006 | Ellwood, Jr. | |
| 2010/0026957 A1 | 2/2010 | Tanguay, Jr. et al. | |
| 2011/0193814 A1 | 8/2011 | Gay et al. | |
| 2011/0249304 A1 | 10/2011 | Kaise | |

OTHER PUBLICATIONS

Parviz, B.A., "Augmented Reality in a Contact Lens," IEEE Spectrum, In Proceedings of the National Academy of Sciences, Sep. 19, 2009.

Gobo (Lighting), From Wikipedia, the free encyclopedia, Apr. 5, 2011.

* cited by examiner

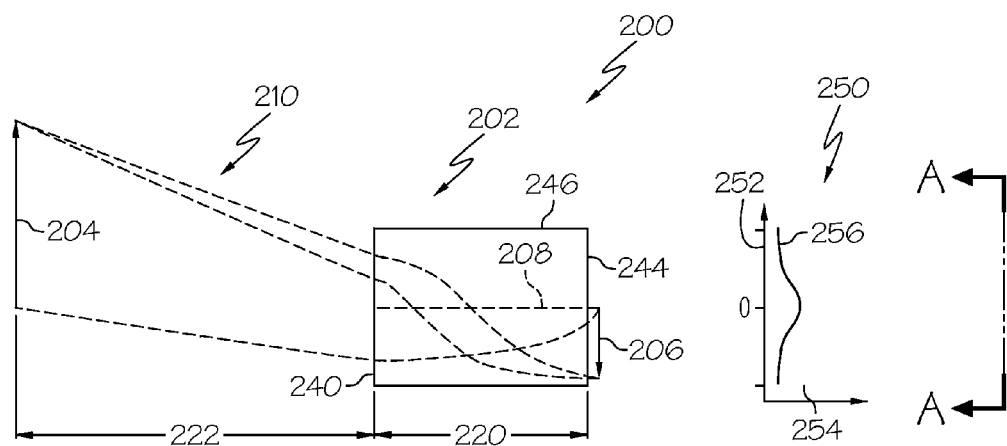
FIG. 2
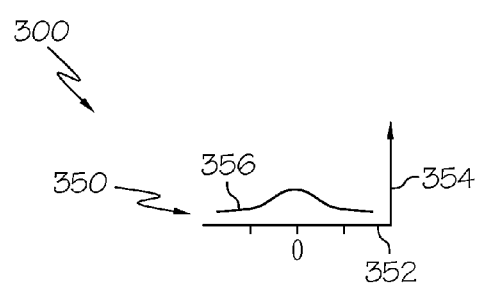
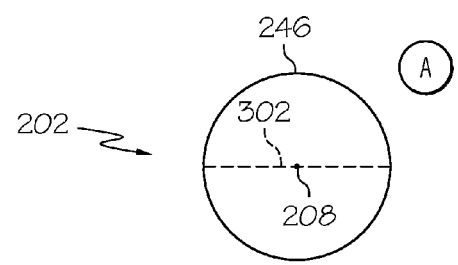
FIG. 3

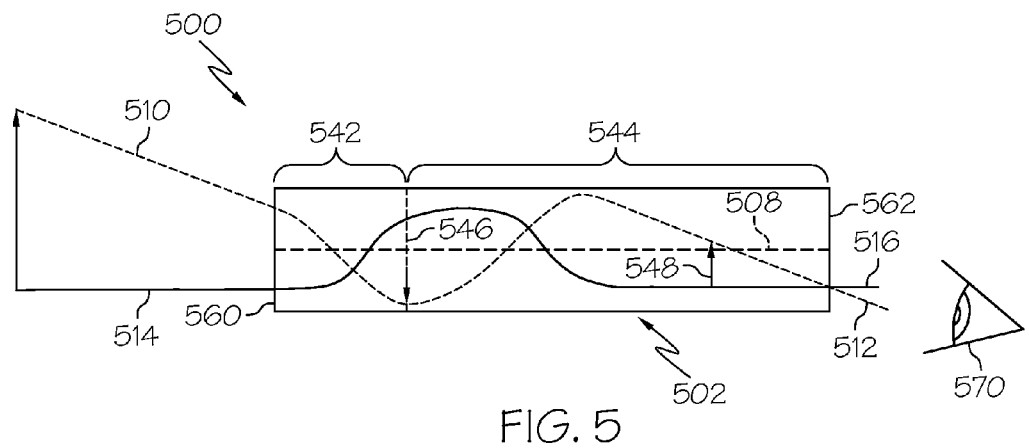

LENS-BASED IMAGE AUGMENTING OPTICAL WINDOW WITH INTERMEDIATE REAL IMAGE

FIELD OF THE DISCLOSURE

The present disclosure generally relates to image augmenting optical systems that are able to modify images of a scene viewed by an observer, and more particularly to optical systems that allow selective blocking of observed image portions and addition of image portions to selected areas of the observed image.

BACKGROUND

Optical viewing systems of various designs exist to modify optical images that pass through those systems. For example, some augmented reality systems incorporate optical systems that allow selective removal of portions of an image of a scene being viewed by a user through the optical system. One example of such optical systems uses a head mounted display that has one optical path or a pair of optical paths with one optical path for each eye. Operations upon the light passing through the one or more optical paths are able to create optical effects, including blockage of portions of the image being viewed. These optical effects are able to create an augmented reality experience. An example of such image processing includes processing that is able to block out part of an image entering the optical path, add visual content to the viewed image at an output of the optical path, or both.

Existing augmented reality systems present various tradeoffs. For example, head mounted displays tend to be thick in order to incorporate the components that make up their optical paths. A head mounted display that incorporates a "see-through" optical path, i.e., an optical path that allows optical images to pass through the optical path of the system, are able to obstruct a portion of the image being viewed, but such obstructions appear to be "blurry" and precise delimiting of the blockage in the observer's sight is not possible. Because such head mounted displays contain the optical paths with the light blocking components and the head mounted display is mounted in close proximity to the wearer's eyes, the light blocking components are not in focus and therefore cannot sharply block portions of the image being viewed.

In general, the images produced by augmented reality systems are presented to an observer so as to appear to be located at a distance of between two meters and infinity in front of the observer. In an example, images created by such displays are able to be added to actual physical scenes being viewed by the observer. The fixed perceived distance of the presented images limit the ability of these presented images to be mixed with or otherwise augment actual physical scenes being viewed by the observer.

Three-dimensional head mounted displays present autostereoscopic images by presenting slightly different images to each eye of an observer. These images are presented by, for example, an LCD display that an observer sees by looking through an optical system of the head mounted display. One aspect of autostereoscopic displays is that each image contains picture elements that are located in the image with location offsets relative to a corresponding picture element in the image presented to the other eye. The different locations of these corresponding picture elements simulate the different angles of arrival of light rays at each of an observer's two eyes from real objects that are located at various distances from the observer.

Such autostereoscopic displays simulate the differences in angle of arrival at each eye due to the simulated distance of a particular object from the observer. When perceiving real objects at various distances, however, the two human eyes perceive not only the difference in angle of arrival of light from a particular object, but the brain further adjusts the lens of each eye to optically bring into focus different objects that are located at different distances from the eye. The human brain detects distance based not only upon different angles of arrival of light form objects at different distances, but also based upon distances that corresponds to the adjustments to the eye's lens that are required to bring the object into focus.

Although conventional autostereoscopic systems accurately simulate the different angle of arrival of light rays from objects at different simulated distances, each eye is still presented with one image containing elements that are all focused by the eye's lens as being at the same distance in front of the eye. In other words, the eye's lens focuses upon all elements of its respective image and all of those elements appear to be located at one distance from the eye—at the perceived distance of the presented image. The operation of such systems presents the brain with inconsistent distance information, the difference in apparent angle of arrival of light from an object does not correspond to the distance of the object that corresponds to the focused distance of the object perceived by the eye's lens. Thus inconsistent distance information presented to the brain sometimes causes a person who is viewing simulated three-dimensional images through an autostereoscopic system to experience headaches or other discomfort.

Therefore, the effectiveness of image modifying optical systems is limited by presenting an observer with images of selectable light blocking components and real images being augmented that appear at different distances from the observer, and are thereby not able to be simultaneously in focus.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 2 illustrates an example adjacently focused Gradient Index (GRIN) lens operation, according to one example;

FIG. 3 illustrates a GRIN lens end view of the adjacently focused GRIN lens depicted in FIG. 2;

FIG. 5 illustrates an internally focused double afocal intermediate image lens operation according to one example;

FIG. 6 illustrates a selectably transmissive internally focused intermediate image lens operation according to one example;

DETAILED DESCRIPTION

Figure 1:
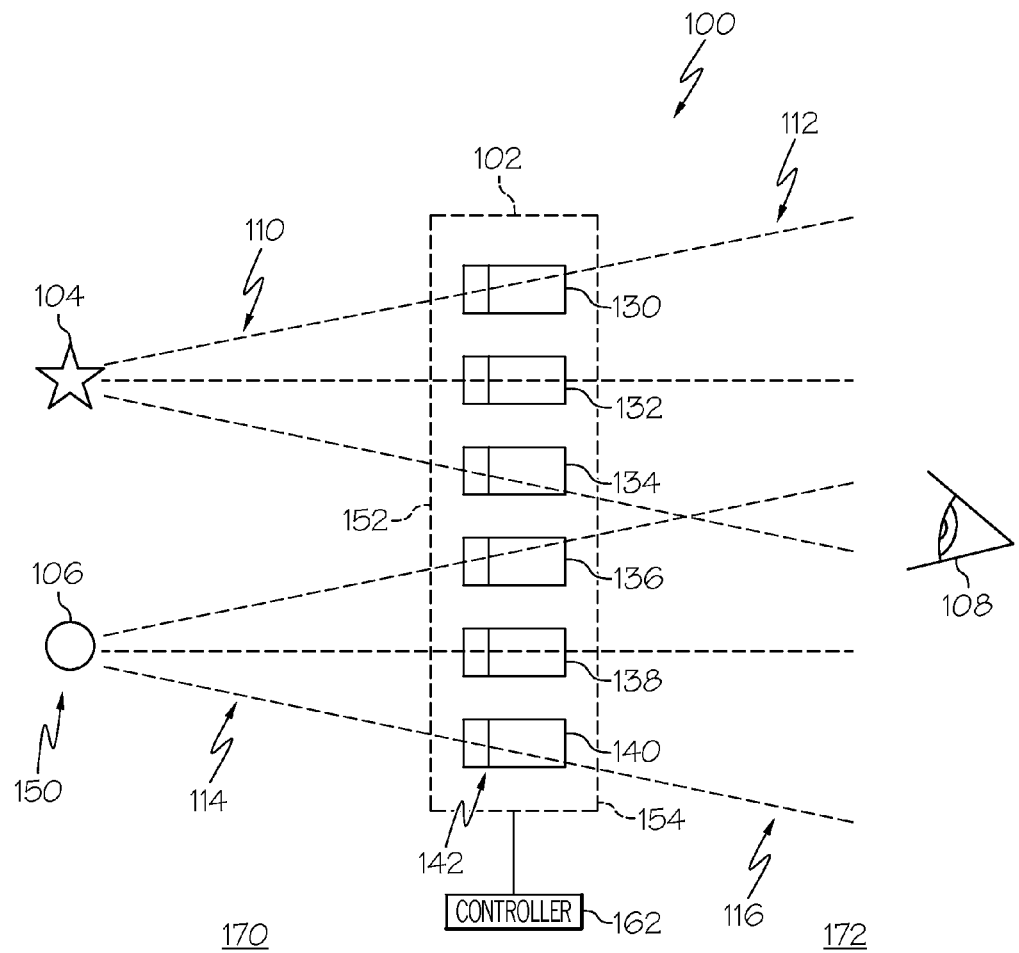
FIG. 1 illustrates operation of a lens based optical window with an intermediate real image, in accordance with one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function. In the following discussion, "handheld" is used to describe items, such as "handheld devices," that are sized, designed and otherwise configured to be carried and operated while being held in a human hand.

Described below are various image augmenting windows, and methods of controlling same, that are used to modify observed, real world scenes by selectively blocking portions of the scenes and replacing the blocked portions of the scene with generated images. Generated images are also able to be superimposed upon scenes being viewed without blocking part or all of the viewed scene from an observer. In general, the observed scene modification is performed in real time as an observer is viewing the real world scene through the image augmenting window.

In one example, image augmenting windows include a lens based window that consists of one or more internally focused intermediate image lenses. In one example, the internally focused intermediate image lenses are selectably transmissive internally focused intermediate image lenses that include, for example, a controllable shutter to block or selectively pass light. Each selectably transmissive internally focused intermediate image lens in a lens based optical window of one example includes a first lens portion and a projecting output optical structure. The first lens portion receives light and focuses the received light into a focused image at a focal plane that is coplanar with a second side of the first portion. A projecting output optical structure, which is able to consist of a second lens portion, has an image side adjacent to the second side of the first lens portion and an opposite side opposite the image side. The projecting output optical structure refracts the focused image as an image projected through its rear side. Each lens further includes a selectably transmissive shutter that is located at the internal focal plane and that is controllable to block at least a portion of light passing therethrough.

In general, each selectably transmissive internally focused intermediate image lens has a minimum of one intermediate image that is brought into focus at a focal point within the lens. A lens based optical window is also generally made up of a number of selectably transmissive internally focused intermediate image lenses that are configured such that exiting light is parallel to light entering the structure. Such configurations are able to include, for example, selectably transmissive internally focused intermediate image lenses that are arranged in parallel with one another. Further examples are able to have selectably transmissive internally focused intermediate image lenses that are not arranged in a parallel structure but have optical elements, such as prisms, that cause light to enter and exit along paths that are parallel to each other. In one example, the selectably transmissive internally focused intermediate image lens forms an internally focused image that is inverted relative to the scene being viewed and an optical structure, such as a prism, lens, or any suitable structure, re-inverts the intermediate image so as to cause it to appear with the same orientation as the scene being viewed. In general, the angles of departure of all of the light rays exiting from the lens based optical window are equal to the angles of arrival of the corresponding light rays entering the lens based optical window.

As used herein, the term "parallel" refers to a relationship of the respective axes of two or more elements such that these elements behave as being parallel with regard to structures operating on those elements. In an example of light rays being viewed by an optical system, substantially parallel light rays are able to be observed by a viewer or processed by an optical system, such as lenses, etc., as though the light rays originate from an object that is sufficiently far so as to be considered at an "infinite" distance. In the optical arts, "infinite" distance is generally understood to refer to a distance that is quite a bit larger than the dimensions of an optical system processing light rays originating from the object. In other words, the below description uses the term "parallel" to include physical relationships of elements that are substantially parallel to one another, where substantially parallel refers to a relationship between the substantially parallel elements such that structures operating on those elements effectively operate on those elements in a manner similar to operating on strictly parallel elements.

In these examples, a selectably transmissive shutter or set of shutters of each selectably transmissive internally focused intermediate image lens is located at a focal plane of an internally focused image of a scene viewed through the lens. In one example, the selectably transmissive shutter is a Liquid Crystal (LC) cell or a configuration consisting of a set of LC cells, that is controllable to able to allow light to be conveyed through the cell or to turn opaque and block light from being conveyed through the cell. Because the selectably transmissive shutter is located in a focal plane of an image of a scene being viewed through the lens, a selectably transmissive shutter that blocks light transmission appears to be in focus with images of the scene. This is due to the structure whereby the projecting output optical structure, such as a second lens portion of the selectably transmissive internally focused intermediate image lens projects an afocal image of the selectably transmissive shutter so as to appear to be at the same distance from the observer as the scene being viewed through other selectably transmissive internally focused intermediate image lenses that are not blocking light transmission.

Allowing the selectably transmissive shutter to appear in focus with an image of a scene being viewed through the lens containing the shutter allows the light blocking element to appear clearly and in focus with the scene being viewed. In one example, a lens based optical window is created by arranging a number of such selectably transmissive internally focused intermediate image lens into a two-dimensional array. In one example, each selectably transmissive internally focused intermediate image lens produces an afocal virtual image of a scene being viewed through that lens, and therefore through the lens based optical window that is made up of a number of such lenses. Because each lens produces an afocal virtual image, the two-dimensional array of lenses is able to be located at any distance from an eye or lens viewing a scene through the lens based optical window consisting of the two-dimensional array of lenses. This allows the two-dimensional array of lenses to be used as, for example, a viewport in a hood that places the lens based optical window close to an observer's eye, or a "window" through which an observer is able to view a scene while looking through the lens based optical window from a larger distance. In an example of a head mounted display or a display located in proximity to a user's eyes, a separate lens based optical window is able to be located in front of each eye of an observer in order to create three-dimensional effects that are based on stereoscopic effects.

In one example, each selectably transmissive internally focused intermediate image lens within a lens based optical window allows modification of the apparent position, as viewed by an observer, of the selectably transmissive shutter within each lens. The operation of the projecting output optical structure, such as the second lens portion, projects an afocal image of the selectably transmissive shutter and by shifting its apparent position relative to its location within other lenses, the light rays of the afocal projections of these selectably transmissive shutters are not parallel to each other. The fact that projections of selectably transmissive shutters are emitted at different angles by the different lenses of a lens based optical window causes an observer's eye to change its focus from infinity to a closer distance, thereby causing the observer's brain to obtain depth information based on the eye's focusing in addition to autostereoscopic effects caused by differences in the images presented to each eye.

In one example, each selectably transmissive internally focused intermediate image lens is designed to project light out of its rear side at an angle that is parallel to an angle at which corresponding light is received at its front side. In such a configuration, an observer on a rear side of a lens based optical window that is made up of a two-dimensional array of selectably transmissive internally focused intermediate image lenses is able to essentially view a scene that is located in front of the front side of the lens based optical window as through the observer is looking through a normal glass window. The operation of the lens based optical window, however, causes the observed image to appear to be closer to the observer by an amount equal to the thickness of the selectably transmissive internally focused intermediate image lenses contained within the lens based optical window. In most situations, this shift in apparent distance is usually negligible or not noticeable by the observer.

In one example, each selectably transmissive internally focused intermediate image lens within a two-dimensional array of lenses has a diameter that corresponds to a "pixel" of the scene being viewed. In this example, activating a selectably transmissive shutter of one selectably transmissive internally focused intermediate image lens appears as though one "pixel" of the image of the scene has been darkened. By darkening selective pixels of the image of the scene, an altered image of that scene is able to be created. In one example, the darkened pixels are able to be replaced by alternative visual elements to create an augmented reality.

Various lens based optical windows are able to have different configurations of selectably transmissive internally focused intermediate image lens and selectably transmissive shutters. In one example, a lens based optical window has a number of selectably transmissive internally focused intermediate image lenses, where each selectably transmissive internally focused intermediate image lens has one selectably transmissive shutter. In that example, the selectably transmissive shutter is able to allow or block all light passing through the selectably transmissive internally focused intermediate image lens. Where each selectably transmissive internally focused intermediate image lens has one corresponding selectably transmissive shutter, each lens is able to be controlled as a "pixel" of a scene being viewed through the window. The number, and size, of selectably transmissive internally focused intermediate image lens used in such a lens based optical window thereby sets the resolution of image modifications that can be applied to scenes being viewed through the lens based optical window.

Further examples of lens based optical windows use selectably transmissive internally focused intermediate image lenses that each has a number of selectably transmissive shutters that are arranged adjacent to one another, such as in a grid, line, or other arrangement. In general, a lens based optical window is able to be made up of an 'm' by 'n' array of selectably transmissive internally focused intermediate image lenses, where each of those lenses has an 'o' by 'p' array of selectably transmissive shutters. In general, the variables 'm,' 'n,' 'o,' and 'p' are any positive integer value. Each of these selectably transmissive shutters is able to effectively define a "pixel" that can be blocked in the scene being viewed through the lens based optical window. One example has an m*n lens-array where each lens has a single, which can be thought of as a one by one (1×1) array where 'o' and 'p' both equal one, selectably transmissive shutter. Another example has a single, which can be thought of as a one by one (1×1) array where 'm' and 'n' both equal one, selectably transmissive internally focused intermediate image lens that has an array of 'o' by 'p' selectably transmissive shutters.

A lens based optical window that include multiple selectably transmissive internally focused intermediate image lenses, however allows a structure whereby the location of the image of the shutter in each lens is able to be manipulated such that the projection of the shutter image is provided at different locations within adjacent lenses, and thereby these multiple projections are able to cause an observer's eye lens to focus at a settable distance to "see" the obstruction. A lens based optical window with only a single selectably transmissive internally focused intermediate image lens with multiple selectably transmissive shutters, however, is not able to provide such depth information for the adjacent shutters, and the observer's eye lens perceives and focuses on the shutter as though it appears at infinite distance.

As discussed below, the selectably transmissive internally focused intermediate image lenses each include selectably transmissive shutters that are located in a focal plane of a focused image of the scene being observed through the lens. The selectably transmissive shutters are able to selectably block light or allow light to traverse through the selectably transmissive internally focused intermediate image lens. Operating the selectably transmissive shutters allows each selectably transmissive internally focused intermediate image lens of a lens based optical window allows selective portions of the window to appear to an observer looking through a window as being either, for example, transparent or black. This configuration causes a selectably transmissive shutter that is blocking light transmission to appear sharp and in focus with the image of the observed scene in a case where there are multiple selectably transmissive internally focused intermediate image lenses used in a window through which an observer is looking.

When the selectably transmissive internally focused intermediate image lenses are configured to produce an afocal virtual image of the observed scene, the lens based optical window that is a two-dimensional array of a number of selectably transmissive internally focused intermediate image lenses can be placed near an observer's eye or another lens to present to the observer's eye or lens an image with clear and focused blockages of selected "pixels" of the image. This characteristic of such a lens based optical window allows, for example, image augmentation by generating images to be projected to the observer's eye or other lens that are superimposed over the clear and focused blockages created by the selectably transmissive internally focused intermediate image lenses.

In alternative examples, the selectably transmissive internally focused intermediate image lens are able to have larger diameters and thereby provide more granular blockages or blackening of portions of an image of the observed scene. In further examples, the selectably transmissive shutter is able to operate to block a portion of light transmission, such as being configured to allow all light to pass or to selectively pass dimmed light or to block a portion of the color spectrum of light entering the selectably transmissive internally focused intermediate image lens.

In one example, the selectably transmissive internally focused intermediate image lenses are constructed of Gradient Index (GRIN) materials, i.e., the selectably transmissive internally focused intermediate image lenses are GRIN lenses. The use of GRIN lenses allows the selectably transmissive internally focused intermediate image lenses to be constructed in a solid and compact structure. Such a solid structure is able to facilitate fabrication of a two-dimensional array of such lenses.

In some examples, the selectably transmissive internally focused intermediate image lenses have a diameter that, in relation to the focal length of the lens, is sufficiently small to provide a lens with a large depth-of-field. This large depth-of-field allows an observer to view objects that are within a large range of distances in front of the lens based optical window that consists of a number of such lenses.

In some examples, the selectably transmissive shutters within the selectably transmissive internally focused intermediate image lenses default to a condition where light is passed without blockage or attenuation. A lens based optical window that consists of such lenses therefore appears to be transparent when, for example, power is lost and the selectably transmissive shutters or other components do not have power, or, for example, if a controller circuit fails. In an example of a lens based optical window that is mounted within a hood worn by a user, the loss of power or controller operations results in the user still being able to see through the lens based optical window. Having the lens based optical window operating, upon loss of power or controller operation, in a potentially safer mode than a system that fails to provide images to a user upon loss of power or control.

Image augmenting windows in one example include one or more controllable light sources that are positioned adjacent to the selectably transmissive internally focused intermediate image lenses described above. For example, a two-dimensional array of selectably transmissive internally focused intermediate image lenses is able to have a number of controllable light sources that provides an image that is superimposed upon, or otherwise added to, the image of an observed scene being viewed through the image augmenting window. In the case of an afocal image augmenting window, the adding of the image of the observed scene and the image created by the controllable light sources is first brought into focus on the retina of the eye of the observer. In one example, controllable light sources are included that provide individual pixels of generated images that are superimposed upon observed images of a scene. The selectably transmissive internally focused intermediate image lenses of the two-dimensional array are able to selectively block portions of an image of a scene being viewed through the image augmenting window, and the controllable light sources provide image "pixels" of a generated image that is superimposed over the observed scene. The pixels of the generated image are able to correspond to portions of the observed scene that are being blocked.

In one example, an image augmenting window includes controllable light sources that are intermixed within a two-dimensional array of selectably transmissive internally focused intermediate image lenses. In this example, a selectably transmissive internally focused intermediate image lens configured to block transmission of light is able to have the blocked light replaced by a light beam projected by an adjacent controllable light source. The controllable light sources included in the image augmenting window are able to have an optical structure, such as a lenses or other optical structures that operate by refraction, reflection, and the like, that projects the light generated by the controllable light sources so as to be parallel to the projection of light that passes through other selectably transmissive internally focused intermediate image lenses of the image augmenting window. In one example, each controllable light source includes a Gradient Index (GRIN) lens that projects light from the light emitter of the controllable light source as though the light emitter is at infinite distance, i.e., the light projected by the controllable light sources are parallel to each other and appear to originate from objects that are sufficiently distant to be considered to be located at infinity.

The controllable light sources are able to have various structures. In one example, an image augmenting window includes an array selectably transmissive internally focused intermediate image lenses that each has an intermediate real image focused on a common plane. This image augmenting window further includes an array of Liquid Crystal (LC) cells to act as selectably transmissive shutters for these selectably transmissive internally focused intermediate image lenses. This array of LC cells is also placed on the common plane at which the intermediate images are focused, as is described above. In this example, the LC array further includes similar LC cells that serve to control light emission from the controllable light sources. In this example, a backlight source is provided to illuminate one side of the portions of the LC array that control the controllable light sources. The individual LC cells allocated to the controllable light sources are then controlled to either block or pass light from that backlight source. In further examples, individually controllable light generators, such as an Organic Light Emitting Diodes (OLEDs), are used as controllable light sources and are intermixed with selectably transmissive internally focused intermediate image lenses within the image augmenting window.

An image augmenting window that intermixes selectably transmissive internally focused intermediate image lenses and controllable light sources is able to be economically constructed. For example, each selectably transmissive internally focused intermediate image lens and each controllable light source of an image augmenting window in one example include optical structures that project the intermediate image and that project the light source, respectively, in a similar manner. For example, some image augmentation windows project the intermediate image and light source so as to appear sufficiently distant from the view so as to appear to be at an infinite distance, i.e., such that projected light rays are all parallel to each other. In such an example, a single optical panel, such as a panel that contains an array of GRIN lenses, is able to contain the optical structures that project both the internally focused images of the selectably transmissive internally focused intermediate image lenses and also project the light generated by the controllable light sources.

The image augmenting windows described herein are able to be constructed in any suitable size. In one example, image augmenting windows are able to appear as viewing portals, which may be similar in appearance to eyeglass lenses, that are placed near a person's eyes. These image augmenting windows are able to be mounted in, for example, eyeglass type frames or other head gear to create a head mounted display. As described below, the image augmenting windows of some examples project an afocal image that is able to be easily and effectively viewed and perceived as in focus by a person's eyes when the person is located at close distances as well as when the viewer is viewing the projected afocal image at farther distances.

These image augmenting windows are further able to be constructed with a large size. An image augmenting window in such a configuration might appear as a window on a wall or as another type of portal mounted on a larger surface that can be opaque, clear, or translucent. The afocal image projected by an image augmenting window allow a person to view the images conveyed through, or modified by, the image augmenting window at any convenient distance. A viewer is able to place his or her eyes close to the rear of the image augmenting window to view images that appear in focus as though viewing those images through a conventional glass pane. The viewer is also able to move back from the image augmenting window and the afocal image projected by the image augmenting window will still be viewed as though viewed through a window pane. For example, the viewer's eyes will properly focus upon images conveyed through or modified by the image augmenting window as the viewer moves his or her head such that his or her eyes are at different distances from the image augmenting window.

The afocal projections of these image augmenting windows allow these devices to be used without dependence upon the distance or location of a viewer observing images produced by these image augmenting windows. This characteristic allows flexible use of such image augmenting windows since multiple persons are able to view an image conveyed or modified by the image augmenting window. Further, a single image augmenting window is able to be simultaneously used by any number of persons, obviating a need to provide multiple image altering devices to each viewer.

As is further described below, the image augmenting windows of some examples operate in a mode where unmodified images are conveyed when there is a controller failure or loss of power. Robust and dependable operation is provided in these examples by gracefully accommodating the loss of power by simply removing image modification processing and allowing unmodified images to be conveyed through the image augmenting window and viewed by a person as though looking through a window. As is described below an image augmenting window that is constructed with an array of selectably transmissive internally focused intermediate image lenses is able to be constructed with respective blocking shutters formed on an efficiently produced array. For example, an array of selectably transmissive internally focused intermediate image lenses can be fabricated with shutters implemented by liquid crystal cells that are efficiently fabricated on a liquid crystal array. Further, the array of optical lenses and other structures used in an image augmenting window are able to be fabricated from a single slab of optical material in order to reduce manufacturing costs.

The below described systems and methods are able to be used in a wide variety of applications. For example, virtual reality systems are able to use the below described systems and methods in a heads up display apparatus. Such heads up display apparatus are able to be included in head mounted displays, such as are mounted in or on hoods or spectacle type frames. Other heads up displays are able to form a viewport through which a person can look. Examples of such viewports include automobile windshields, windscreens or windows through which a vehicle operator, such as an aircraft or boat pilot, views his or her vehicle's surroundings, and the like.

FIG. 1 illustrates operation of a lens based optical window with an intermediate real image 100, in accordance with one example. The operation of the lens based optical window with an intermediate real image 100 depicts a lens based optical window 102 through which light passes. The lens based optical window 102 has two sides, a first side 152 and a back side 154. The following discussion refers to two areas that are divided by the lens based optical window 102, a first area 170 that is essentially beyond or in front of the first side 152, and a rear area 172 that is essentially beyond or in front of the back side 154.

The operation of a lens based optical window with an intermediate real image 100 shows that the first area 170 has a scene 150 that includes two objects, a first object 104 and a second object 106. The scene 150 in this example is removed from and located beyond a first side 152 of the lens based optical window 102. The rear area 172 includes an observer 108 that is located beyond a back side 154 of the lens based optical window 102. The observer 108 is located beyond a side of the lens based optical window 102 that is opposite the side that is closest to the scene 150. The observer 108 generally observes images that pass through the lens based optical window 102 by using a focusing optical system. For example, an observer 108 is able to be a person that views images of the scene 150 with his or her eyes. In another example, the observer 108 is able to be a camera with a focusing lens that captures an image of the scene 150.

Light radiates, such as by reflection or emission, from objects in the scene 150 and a portion of that light reaches a first side 152 of the lens based optical window 102. In this example, the first side 152 is a side of the lens based optical window 102 that is closest to the scene 150. The light that reaches the lens based optical window 102 includes a first object view 110 that leaves the first object 104 and enters the first side 152 of the lens based optical system 102 and exits as a first transmitted view 112 out of the back side 154 of the lens based optical window 102. A second object view 114 leaves the second object 106 and also enters the first side 152 of the lens based optical system 102, but at a different angle than the first object view 110, and exits as a second transmitted light 116 out of the back side 154 of the lens based optical window 102.

In one example, the lens based optical window 102 passes light from one side to the other without altering the direction of travel of that light. In one example, the light entering the first side 152 exits the back side 154 with no net divergence. Due to this property, images viewed through lens based optical window 102 appear as though those images are being viewed through a transparent opening or through a conventional, clear "window." Images that are viewed through the lens based optical window 102 of one example are therefore not inverted, magnified or reduced in size. In other words, the lens based optical window 102 is able to be configured pass light so as to not modify or distort images that an observer 108 sees through the lens based optical window 102. The image viewed through the lens based optical window 102 does, however, appear to be closer to the observer by a distance equal to the thickness of the optical paths making up the lens based optical window 102.

The illustrated lens based optical window 102 has a number of intermediate image lenses that are arranged laterally next to one another to form a field of intermediate image lenses. In the following discussion, the term intermediate image lens refers to an optical structure through which light enters at one end, that entering light is then focused into at least one intermediate image at a respective focal plane within the optical structure, and that focused image is then projected out of the other end of the optical structure. In some examples, the light leaving the optical structure has a direction of travel that is parallel to the direction of travel of the light entering the optical structure. The parallel relationship between the direction of travel of light entering and leaving the optical structure is maintained for directions of travel of light entering the optical structure that vary over a range of angles relative to the first side 152.

The illustrated lens based optical window 102 has a number of intermediate image lenses that are laterally arranged next to one another. In further examples a lens based optical window is able to have intermediate image lenses that are each oriented in different directions. Such constructions are found in tilt-shift lenses for cameras. In one example, an lens based optical window with intermediate image lenses that are positioned in different directions are able to have optical structures, such as prisms, that cause the light exiting each of the intermediate image lenses to be directed so as to exit the composite lens based optical window in the proper direction. The illustrated lens based optical window further depicts the intermediate images to be formed on a common intermediate focal plane 142. In further examples, the intermediate image formed in each intermediate image lens is able to be on a different plane relative to images formed in other intermediate image lenses of the lens based optical window.

In operation, light entering one end of an intermediate image lens appears to leave the other end of the intermediate image lens without modification. As described in further detail below, images being viewed through an intermediate image lens are able to be modified by various techniques. In one example, some or all of an image being conveyed through an intermediate image lens is able to be replaced with alternative images to perform selective augmentation of observed images. In another example, optical blockages are inserted at locations within the intermediate image lens that cause those optical blockages to be projected onto the plane of observed objects. In one example, these alternative images or optical blockages are located in a focal plane of the intermediate image lens where observed images are focused. Because the image modification is able to be placed on the same focal plane of the focused intermediate image within the optical path, such augmentation or blockages appear to be projected onto the same place as the observed image, and therefore appear to be sharp and in focus.

The illustrated lens based optical window 102 depicts six intermediate image lenses, including a first intermediate image lens 130, a second intermediate image lens 132, a third intermediate image lens 134, a fourth intermediate image lens 136, a fifth intermediate image lens 138, and a sixth intermediate image lens 140. These six intermediate image lenses are shown in a vertical arrangement to illustrate a portion of what is able to be a larger two-dimensional array of intermediate image lenses. In the case of such a larger two-dimensional array of intermediate image lenses, the intermediate real image 100 depicts a side view of that array. The operation of a lens based optical window with an intermediate real image 100 indicates a common intermediate focal plane 142 that is within each of the illustrated intermediate image lenses. In operation, images viewed by an observer 108 through the lens based optical window 102 are focused at the common intermediate focal plane 142 within the respective optical path of each intermediate image lens. The separate optical paths and focusing operations of the different intermediate image lenses causes an eye of the observer 108 to focus on the individual projected images from each intermediate image lens and thus distance information to support full three-dimensional imaging of the observed scene 150 is maintained.

As is described in further detail below, the lens based optical window 102 is also able to be configured to selectably block part or all of an image viewed through the lens based optical window 102. In one example, independently controllable selective light blocking apertures, such as liquid crystal cells, are placed within each of the intermediate image lenses at a location that corresponds to the common intermediate focal plane 142. Because these selective blocking apertures are placed at a focal plane of the intermediate image lenses that form the lens based optical window 102, such selective blocking appears to be projected into the same plane as the virtual image of the scene 150 being viewed through each of the intermediate image lenses within the lens based optical window 102. Because these selective blocking apertures are projected into the same virtual image plane as objects within the observed scene 150, the image blockage appears to be sharp and in focus to an observer 108 viewing the scene 150. In one example, the selective blocking aperture of each of the intermediate image lenses is independently controlled by a controller 162.

An analysis of intermediate image lens operations refers to a focal length of those lenses with respect to forming their internally focused intermediate images at the common intermediate focal plane 142. In one example, a design of a lens based optical window 102 includes intermediate image lenses that have a narrow diameter relative to that focal length. As a result, the intermediate image lenses have a large depth of field and are able to clearly project images of objects located at a wide variety of ranges from the first side 152 of the lens based optical window 102. In one example, the lens based optical window 102 is able to clearly represent to an observer 108 objects that are located between an infinite distance and a close distance from the first side 152.

Any individual lens of the lens based optical window 102 of one example produces an afocal projection of the scene 150 through its back side 154. The afocal nature of the emitted light allows an observer 108 to be located at any distance from the back side 154. In one example, the lens based optical window 102 is configured to be placed in relatively close proximity to a user's eyes. In one example, the lens based optical window 102 is mounted in a frame to be worn by a user in a manner similar to "glasses." In another example, the lens based optical window 102 is part of a hood or other apparatus that positions the lens based optical window 102 near the user's eyes. Further examples are able to place a lens based optical window 102 at any distance from the observer 108.

FIG. 2 illustrates an example adjacently focused Gradient Index lens operation 200, according to one example. The adjacently focused Gradient Index lens operation 200 depicts optical characteristics of a portion of an intermediate image lens that is incorporated into a lens based optical window 102 discussed above. The adjacently focused Gradient Index lens operation 200 depicts an adjacently focused GRadient INdex (GRIN) lens 202. GRIN lenses are lenses that have an index of refraction that generally varies with radial position from a center axis of the lens. The adjacently focused GRIN lens 202 has a lens length 220 that extends between a first end 240 and an opposite end 244. The adjacently focused GRIN lens 202 has a center axis 208 along the lens length 220.

In the illustrated example adjacently focused Gradient Index lens operation 200, an object 204 is in front of the adjacently focused GRIN lens 202. Light from the object 204 enters a first end 240 of the adjacently focused GRIN lens 202 and a focused image 206 of the object 204 is formed in this example immediately adjacent to an opposite end 244 of the adjacently focused GRIN lens 202.

The adjacently focused GRIN lens 202 is made of material that has an index of refraction that changes with radial position from the center axis 208. An index of refraction graph 250 is depicted adjacent to the adjacently focused GRIN lens 202 and illustrates the variation in gradient index with respect to radial distance from the center axis 208 of the adjacently focused GRIN lens 202. The index of refraction graph 250 has a radial distance axis 252, an index of refraction axis 254, and an index of refraction trace 256. The radial distance axis 252 is depicted as perpendicular to the center axis 208 and has a value of zero (0) corresponding to the center axis 208. The index of refraction axis 254 indicates values of the index of refraction of the material from which the adjacently focused GRIN lens 202 is made as a function of radial distance from the center axis 208. In this illustration, the distance between the radial distance axis 252 and the index of refraction trace 256 is proportional to the value of the refraction index of the material from which the adjacently focused GRIN lens 202 is made. In the illustrated example, the index of refraction has a gradient, or a change of value, whereby the index of refraction decreases with distance from the center axis 208 as one moves away from the center axis 208 towards an outer circumference 246 of the adjacently focused GRIN lens 202. It is to be noted that the outer circumference 246 of the adjacently focused GRIN lens 202 is parallel to the center axis 208 along the length of the adjacently focused GRIN lens 202.

The adjacently focused Gradient Index lens operation 200 illustrates an object 204 that is at a distance "L" 222 from the first end 240 of the adjacently focused GRIN lens 202. Light rays 210 from the object 204 enter the first end 240 and are bent due to the index of refraction and the gradient of that index of refraction of the adjacently focused GRIN lens 202. In the illustrated example, the light rays from the object 204 are bent within the adjacently focused GRIN lens 202 so as to produce a focused image 206 that is present at a distance from the first end 240 that is equal to the lens length 220. Because the focused image 206 is formed at a distance from the first end 240 that is equal to the lens length 220, the focused image 206 is formed directly adjacent to the end of the refractive material forming the opposite end 244 of the adjacently focused GRIN lens 202, i.e., the focused image is essentially formed at the opposite end 244 of the adjacently focused GRIN lens 202.

In one example, the adjacently focused GRIN lens 202 forms a front part of an intermediate image lens, such as are described above with regards to FIG. 1. In such an example, an adjacently focused GRIN lens 202 forms a front part of an intermediate image lens that is adjacent to the first side 152 of the lens based optical window 102 into which light from objects, such as object 204, is received. In such an intermediate image lens, refractive material forming the remainder of the intermediate image lens extends beyond the opposite end 244 of the adjacently focused GRIN lens 202. In one example, the intermediate image lens has a front end corresponding to the first end 240 into which light enters. The light that enters the intermediate image lens is then refracted into a focused intermediate image that corresponds to the focused image 206. As is discussed in detail below, the refractive material of the intermediate image lens that extends beyond the opposite end 244 further refracts the light to create certain effects.

Although the illustrated adjacently focused GRIN lens 202 forms a focused image 206 at its opposite end 244, alternative examples are able to form a focused image 206 at a point beyond the opposite end 244. It is further clear that the described optical effects of the adjacently focused GRIN lens 202, including forming a focused image 206 at a distance of the lens length 220 from the first end 240, are able to be performed by other optical constructs, such as conventional lenses or a "pin-hole" lens that is used on conjunction with a screen to form the focused intermediate image.

FIG. 3 illustrates a GRIN lens end view 300 of the adjacently focused GRIN lens 202 depicted in FIG. 2. In this example, the GRIN lens end view 300 is a side looking perspective "A" depicted in the adjacently focused Gradient Index lens operation 200 of FIG. 2. The GRIN lens end view 300 shows the center axis 208 and the outer circumference 246 of the adjacently focused GRIN lens 202. The GRIN lens end view 300 illustrates a center line 302 that is perpendicular to the center axis 208 and that also extends through the center axis 208.

The GRIN lens end view 300 includes an index of refraction chart 350. The index of refraction chart 350 is a horizontal replica of the refraction graph 250 discussed above and presented in FIG. 2. The index of refraction chart 350 includes a radial distance axis 352, an index of refraction axis 354, and an index of refraction trace 356. The radial distance axis 352 has a central value of zero (0) that corresponds to the center axis 208. Distances along the radial distance axis 352 correspond to distances from the center axis 208 along the center line 302, i.e., at the widest point of the adjacently focused GRIN lens 202. The illustrated center line 302 is shown to extend horizontally through the GRIN lens end view 300. The distance between the radial distance axis 352 and the index of refraction trace 356, corresponding the index of refraction axis 354, is proportional to the value of the index of refraction of the material from which the adjacently focused GRIN lens 202 is constructed. In one example, the index of refraction varies similarly along a line through a cross-section with any orientation that is perpendicular to and extends through the center axis 208. For example, a line that extends through the center axis 208 with a vertical orientation, or with an orientation at any angle between vertical and horizontal, with respect to the GRIN lens end view 300, observes a similar index of refraction gradient for the material from which the adjacently focused GRIN lens 202 is made.

Figure 4:
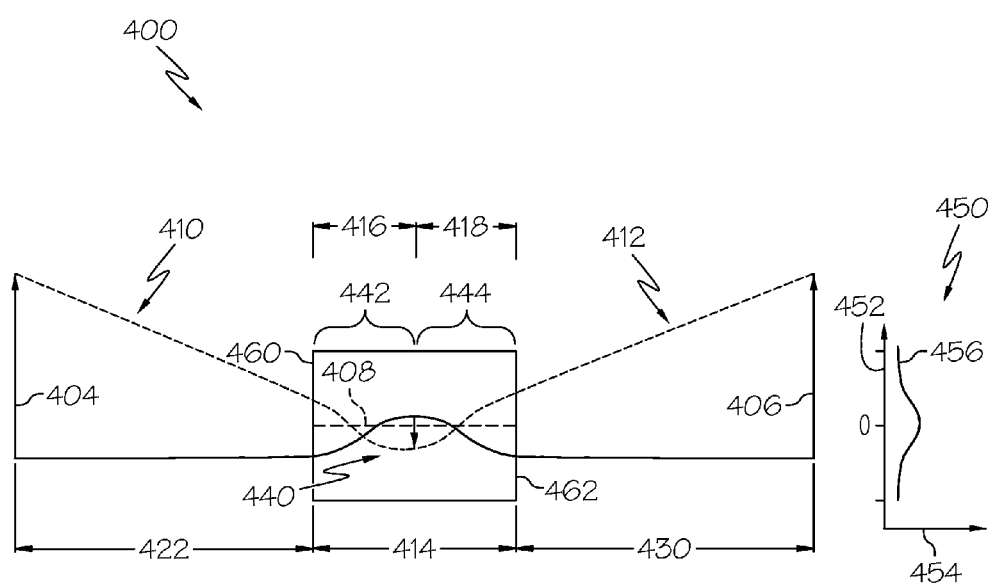
FIG. 4 illustrates a dual focal point GRIN lens operation, in accordance with one example.

FIG. 4 illustrates a dual focal point GRIN lens operation 400, in accordance with one example. The dual focal point GRIN lens operation 400 depicts a dual focal point GRIN lens 402 that receives incoming light rays 410 from an object 404 that is at a relatively large distance 422 from a front surface 460 of the dual focal point GRIN lens 402. The illustrated dual focal point GRIN lens 402 projects light through its back surface 462 so as to form an externally focused image 406. In one example, a focusing lens based optical window is able to be formed from a number of dual focal point GRIN lens 402, where such a focusing lens based optical window is able to form a focused image at a finite point behind the lens. Such a focusing lens based optical window has similarities to the lens based optical window 102 discussed above with the exception that light projected from the rear of the focusing lens based optical window forms a focused image behind the lens. The illustrated dual focal point GRIN lens operation 400 further illustrates the operation of an intermediate focused image GRIN lens, where the intermediate focused image GRIN lens projects a focused image of its observed scene.

As is familiar to practitioners of ordinary skill in the relevant arts, the relatively large distance 422 is sometimes referred to in the art as an "infinite" distance because light originating from different portions of the object 404 are substantially parallel to each other when they reach the front surface 460. Because these light rays are substantially parallel to each other, causing the object 404 appears to be at an essentially infinite distance from the front surface 460.

The dual focal point GRINS lens 402 of this example, has an index of refraction gradient along its radial dimension that is similar to that discussed above for the adjacently focused GRIN lens 202. The dual focal point GRIN lens operation further depicts an index of refraction graph 450 that contains a radial distance axis 452, an index of refraction axis 454, and an index of refraction trace 456. As discussed above for the adjacently focused GRIN lens 202, the dual focal point GRINS lens 402 has a refractive index gradient profile that is the same along any radial that is perpendicular to the center axis 408.

The dual focal point GRIN lens 402 has a length 414 that separates the front surface 460 from a back surface 462. The dual focal point GRIN lens 402 receives incoming light rays 410 at the front surface 460 and those light rays pass through the dual focal point GRIN lens 402 to exit from the back surface 462. The path of light propagating through the dual focal point GRIN lens is altered due to the refractive index of the material from which the dual focal point GRIN lens 402 is made. The gradient of that refractive index along a radial distance from a center axis 408 of the dual focal point GRIN lens 402 further affects the paths of the received incoming light rays 410 change as they pass through the length 414 of the dual focal point GRIN lens 402.

The illustrated dual focal point GRIN lens 402 has a length 414 that is selected so as to create what can be conceptualized as two lens portions, a first lens portion 442 and an adjacent second lens portion 444. An analysis of light rays traversing the dual focal point GRIN lens 402 can divide the paths of those light rays into two portions, a first portion wherein the light traverses the first lens portion 442, and a second portion where that light subsequently traverses the second lens portion 444. The first lens portion 442 is adjacent to the front surface 460 and has a first length 416. The first lens portion refracts the received incoming light rays 410 and creates a focused intermediate image 440 at the first length 416 from the front surface 460. In this example, the first lens portion 442 operates similarly to the adjacently focused GRIN lens 202, discussed above. Because the first lens portion 442 and the second lens portion 444 in this example are constructed of one piece of material, the focused intermediate image 440 is formed within that material, i.e., within the dual focal point GRIN lens 402. Conceptually, the first lens portion 442 and the second lens portion 444 are able to be made from one solid piece of material, or the first lens portion and the second lens portions are able to be made of separate pieces of material that are separated at the interface between those portions. As is described in further detail below, some examples create a selectably switched optical path by inserting a switchable light block between the first lens portion 442 and the second lens portion 444.

The second lens portion 444 is an example of a projecting output optical structure. The second lens portion 444 is adjacent to the first lens portion 442 on an end that is opposite the front surface 460. In the illustrated example, the dual focal point GRIN lens 402 is formed from a single piece of material that seamlessly forms the first lens portion 442 and the second lens portion 444. The focused intermediate image 440 is also located on one end of the second lens portion 444, the end of the second lens portion 444 that is opposite the back surface 462. The second lens portion has a second length 418. The second length 418 is selected so that, in combination with the refraction index gradient of the material from which the second lens portion 444 is formed, the focused intermediate image 440 is projected out of the back surface 462 of the dual focal point GRIN lens 402 so that an externally focused image 406 of the focused intermediate image 440 is created at a focal distance 430 beyond the back surface 462.

The dual focal point GRIN lens operation 400 illustrates that the incoming light rays 410 are refracted into a focused intermediate image 440. This focused intermediate image 440 is an inverted image relative to the object 404, i.e., the focused intermediate image 440 is rotated 180 degrees around the center axis 408 relative to the image of the object 404 represented by the received incoming light rays 410. This focused intermediate image is located within the dual focal point GRIN lens 402.

FIG. 5 illustrates an internally focused double afocal intermediate image lens operation 500 according to one example. The example internally focused double afocal intermediate image lens operation 500 depicts an internally focused double afocal intermediate image lens 502 that, with respect to the transfer of light from a first surface 560 through to a back surface 562, operates as an afocal optical system that does not invert the image being transferred. As is understood by practitioners of ordinary skill in the relevant arts, an afocal lens configuration generally inverts a scene being observed through the afocal lens. In contrast to such conventional afocal lenses, the internally focused double afocal lens forms two internally focused images within the lens structure and emits an afocal projection of an observed image that is not inverted.

The internally focused double afocal intermediate image lens 502 receives and passes light rays that exit the internally focused double afocal intermediate image lens 502 with no net divergence or convergence to create a virtual image to be viewed by an observer 570. The internally focused double afocal intermediate image lens operation 500 depicts the paths of offset incoming light waves 510 and perpendicular incoming light waves 514 as they arrive from an object 504 at the first surface 560 and traverse an internally focused double afocal intermediate image lens 502 to exit the opposite back surface 562 to produce create a virtual image for an observer 570.

The internally focused double afocal intermediate image lens 502 receives light waves that arrive at an incoming angle that is an acute angle relative to a plane of the front surface 560. These light rays are refracted as they pass through the internally focused double afocal intermediate image lens such that they are transmitted out of a back surface 562 at an exit direction which is, in one example, along paths that are parallel to the incoming direction of the path of the incoming light waves. In the illustrated example, perpendicular outgoing light waves 516 correspond to the perpendicular incoming light waves 514. The perpendicular outgoing light waves 516 also follow paths that are parallel to, and that as illustrated are co-linear with, the perpendicular incoming light waves 514. The offset outgoing light waves 512 correspond to the offset incoming light waves 510. The offset outgoing light waves 512 also follow paths that are parallel to the offset incoming light waves 510 and creates a virtual image that appears to the observer 570 to be collocated with the object 504. In other words, an eye of observer 570 that is located on one side of the internally focused intermediate image lens 502 observes the object 504 that is on the other side of the internally focused double afocal intermediate image lens 502 as though the internally focused double afocal intermediate image lens 502 is not present except for the characteristic that the object 504 appears to be closer to the eye of the observer 570 by the length of the lens 502. In general, this change in perceived distance to objects 504 is small and thus can be neglected.

The internally focused double afocal intermediate image lens 502 in one example is constructed of a material with a Gradient Index of refraction that has characteristics similar to the indexes of refraction described above for the adjacently focused GRIN lens 202 and the dual focal point GRIN lens 402. In other words, the index of refraction of the internally focused double afocal intermediate image lens 502 conforms to the index of refraction graph 250 and the index of refraction graph 450. In particular, the index of refraction of this example internally focused double afocal intermediate image lens 502 varies with radial position away from the center axis 508 of the internally focused intermediate image lens 502.

The path followed by the incoming light waves 514 as they traverse the internally focused double afocal intermediate image lens 502 are bent as a result of the values of and variations in the index of refraction of materials located within the internally focused double afocal intermediate image lens 502. The operation of the internally focused double afocal intermediate image lens 502 produces two internal focused images, a first focused image 546 and a second focused image 548. In order to describe the operation of the internally focused double afocal intermediate image lens 502, it is possible to conceptualize two parts of this device, a first part 542 and a second part 544. In one example, the index of refraction of the material forming the first part 542 and the second part 544 has a similar radial profile along the entire length of the internally focused double afocal intermediate image lens 502. In further examples, internally focused double afocal intermediate image lenses are able to be formed with materials that have different indexes of refraction, varying index of refraction profiles along one or both of their longitudinal axis, e.g., axes along or parallel to the center axis 508, and their radial axis, e.g., axes perpendicular to the center axis 508.

The first part 542 of the internally focused double afocal intermediate image lens 502 operates similarly to the adjacently focused GRIN lens 202 and the first lens portion 442 of the dual focal point GRIN lens 402, discussed above. Light rays entering the first surface 560 form the first focused image 546 at the opposite end of the first part 542. The light rays forming the first focused image 546 continue into the second part 544.

The length of the second part 544 is sufficiently long so as to refract light traversing the second part 544 to form a second focused image 548 within the second part 544. The second part 544 extends beyond the location of the second focused image 548 so as to create light rays that exit the back surface 562 without net convergence or divergence.

In one example, the internally focused double afocal intermediate image lens 502 is one intermediate image lens within an array of intermediate image lenses, such as is described above for the lens based optical window 102. An observer looking through a lens based optical window 102 that consists of an array of internally focused double afocal intermediate image lenses observes a virtual image of objects that are located on the other side of the lens based optical window. The existence of the two internal focused images, the first focused image 546 and the second focused image 548, allows modification of portions of the light conveyed through the lens based optical window 102. In one example, a selectably transmissive shutter, or several selectably transmissive shutter-pixels, is placed at the location of one or both of the two internal focused images. The selectably transmissive shutter is controllable to selectably pass light or block light that passes through a particular internally focused double afocal intermediate image lens 502.

FIG. 6 illustrates a selectably transmissive internally focused intermediate image lens operation 600 according to one example. The selectably transmissive internally focused intermediate image lens operation 600 depicts the light paths through a selectably transmissive internally focused intermediate image lens 602. The illustrated selectably transmissive internally focused intermediate image lens 602 is a internally focused intermediate image lens, such as the above described internally focused double afocal intermediate image lens 502, that further includes a selectably transmissive shutter 604 that is located in an internal focal plane of the lens where an internally focused image is formed, such as the first focused image 546 discussed above.

In one example, the optics of the selectably transmissive internally focused intermediate image lens 602 operates in a manner similar to that discussed above with regards to the internally focused double afocal intermediate image lens 502. As discussed above with regards to the internally focused double afocal intermediate image lens 502, the selectably transmissive internally focused intermediate image lens 602 forms two internally focused images of a scene 620, where those internally focused images are internal to the structure of the selectably transmissive internally focused intermediate image lens 602. Depicted are a first focused internal image 646 and a second focused internal image 648 that are formed at locations within the selectably transmissive internally focused intermediate image lens 602.

The depicted selectably transmissive internally focused intermediate image lens 602 has a selectably transmissive shutter 604 located at a location of a first focused internal image 646. The selectably transmissive shutter 604 is, for example, a Liquid Crystal cell that is able to be selectably configured to pass light or to not pass light. The selectably transmissive shutter 604 of various examples is able to have a single cell that is selectably configurable to either pass light or to not pass light for the entire scene portion conveyed by the selectably transmissive internally focused intermediate image lens 602. In other examples, the selectably transmissive shutter 604 within one selectably transmissive internally focused intermediate image lens 602 has an array of selectably transmissive cells, such as are contained in Liquid Crystal Display. A selectably transmissive shutter 604 that is made up of an array of selectably transmissive cells is able to block transmission of portions of the scene being transferred through the selectably transmissive internally focused intermediate image lens 602.

The selectably transmissive shutter 604 of the selectably transmissive internally focused intermediate image lens 602 is controlled by a controller 660. In an example of a lens based optical window 102 that is made up of an array of selectably transmissive internally focused intermediate image lenses 602, the controller 660 controls the respective selectably transmissive shutter 604 of each selectably transmissive internally focused intermediate image lens 602 in the array. In that example, selectably controlling the respective selectably transmissive shutters of selected selectably transmissive internally focused intermediate image lenses in the array to not pass light, while controlling the remaining selectably transmissive shutters to pass light, allows controllable blocking of portions of the scene being transferred through the lens based optical window 102.

By placing a selectably transmissive shutter 604 at the location of a focused image, such as the first focused internal image 646, the light being transferred through the selectably transmissive shutter 604 is able to be blocked by an obstacle that is placed in the same focal plane as an image of the scene. This causes the light obstacle to appear to be in focus at an infinite length, even when the selectably transmissive internally focused intermediate image lens 602 is located near an observer's eye or lens. As discussed below, the selectably transmissive shutter 604 is able to be located within various positions in the focused plane, thereby shifting the position of the blocking shutter of a particular lens as perceived by an observer. By shifting the location of the shutter in each lens, the perceived distance of the blocking object is able to be modified. In one example, the perceived distance of the blocking object is able to be made to appear as though it is at the distance of the object.

Figure 7:
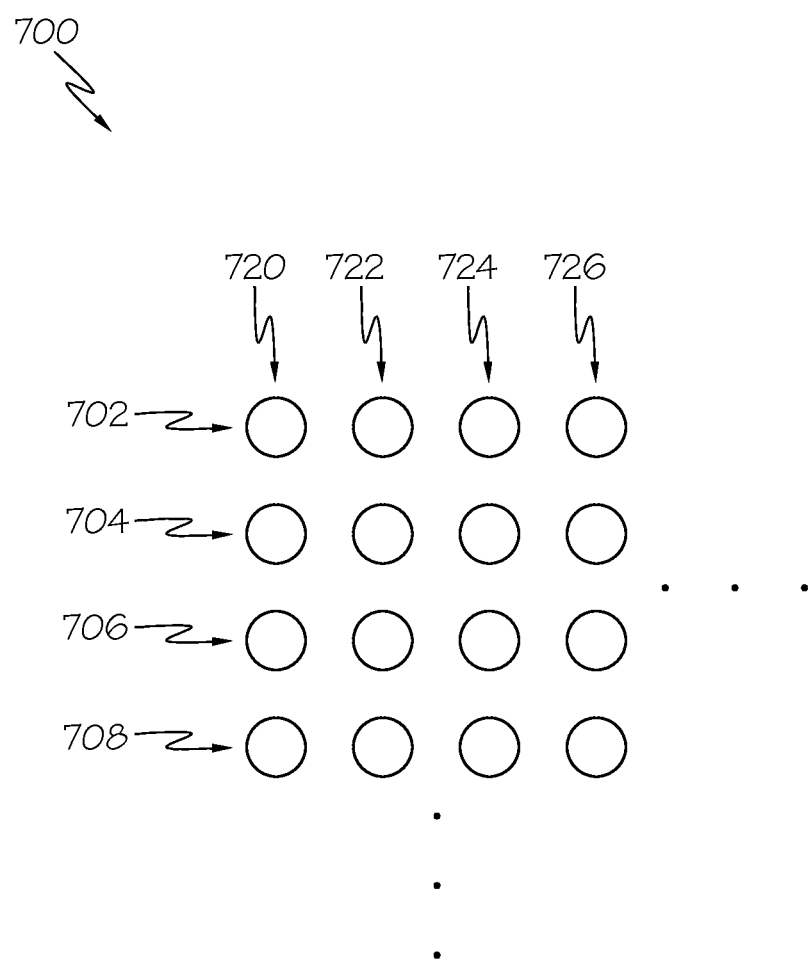
FIG. 7 illustrates a lens based optical window front view according to one example.

FIG. 7 illustrates a lens based optical window front view 700 according to one example. The lens based optical window front view 700 illustrates a front view of a portion of the lens based optical window 102 discussed above and with a side view depicted in FIG. 1. The lens based optical window front view 700 depicts a lens based optical window that is made up of a two-dimensional array of intermediate image lenses. The lens based optical window front view 700 shows a first four rows and a first four columns of intermediate image lenses that make up a larger lens based optical window. In various examples, a lens based optical window is able to include any practical number of intermediate image lenses. The intermediate image lenses are also able to be arranged in any suitable configuration. In one example, each of the depicted intermediate image lenses depicted in the lens based optical window front view 700 are selectably transmissive internally focused intermediate image lens 602 as are described above with regards to FIG. 6.

The lens based optical window front view 700 depicts a first row 702 of four intermediate image lenses that contains four intermediate image lenses. The first row 702 depicts intermediate image lenses in each of a first column 720, a second column 722, a third column 724, and a fourth column 726. The lens based optical window front view 700 further depicts a second row 704, a third row 706 and a fourth row 708 that each include four intermediate image lenses, one in each of the first column 720, the second column 722, the third column 724 and the fourth column 726. The lens based optical window front view 700 depicts these four rows and columns of intermediate image lenses as an example of a larger array.

In one example, each intermediate image lens depicted in the lens based optical window front view 700 has a small diameter as viewed in the lens based optical window front view 700. In the case of the lens based optical windows 102 that consist of an array of selectably transmissive internally focused intermediate image lenses 602, the selectably transmissive internally focused intermediate image lenses 602 that are configured to block light transmission appear to an observer viewing the scene as a dark "pixel" of the scene being viewed. In further examples, the diameter of the intermediate image lenses are able to be larger and therefore provide a more granular blocking of portions of the scene being viewed through the lens based optical window front view 700.

Figure 8:
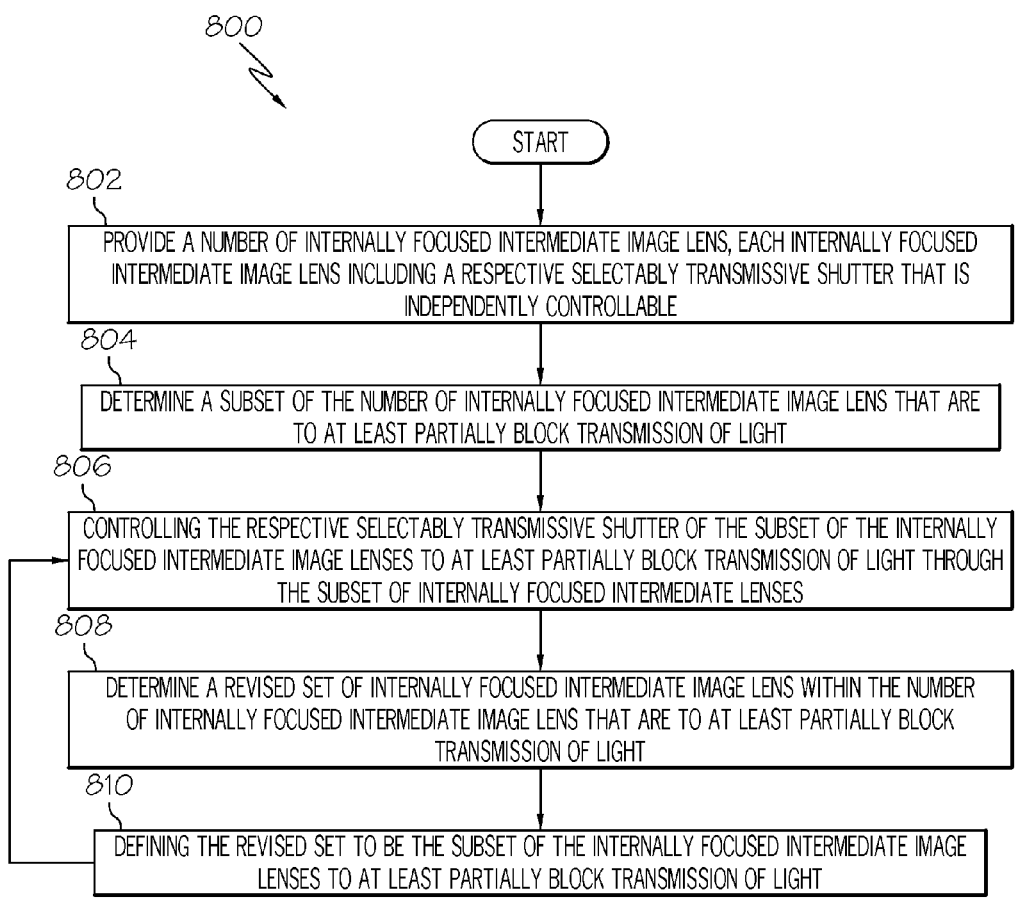
FIG. 8 illustrates a lens based optical window control process according to one example.

FIG. 8 illustrates a lens based optical window control process 800 according to one example. In one example using FIG. 1 as a reference, the lens based optical window control process 800 is performed by controller 162 to control the selectably transmissive shutters that are within each intermediate image lenses. In this example, the selectably transmissive shutter that is contained in each intermediate image lens is controllable independently of any other selectably transmissive shutter located in another intermediate image lens. The selectably transmissive shutters are in one example located at the common intermediate focal plane 142 of the lens based optical window 102, as is described above.

The lens based optical window control process 800 begins by providing, at 802, a number of internally focused intermediate image lens where each internally focused intermediate image lens has a respective selectably transmissive shutter that is independently controllable. The lens based optical window 102 described above is an example of a structure that provides a number of internally focused intermediate image lenses. The internally focused intermediate image lenses in one example are arranged in a two-dimensional array as is described above with regards to the lens based optical window front view 700 depicted in FIG. 7. In one example, the lens based optical window 102 has internally focused intermediate image lenses that are each similar to the selectably transmissive internally focused intermediate image lens 602 described above with regards to FIG. 6.

The lens based optical window control process 800 continues by determining, at 804, a subset of the number of internally focused intermediate image lens that are to at least partially block transmission of light. In one example, each selectably transmissive shutter is able to be controlled to block all light or a portion of light that is conveyed through the selectably transmissive internally focused intermediate image lens 602 that make up a lens based optical window. Selectably blocking all light that is conveyed through a subset of selectably transmissive internally focused intermediate image lenses 602 within a lens based optical window allows portions of a scene viewed through that lens based optical window to be "blacked out." In one example, a substitute image is able to be inserted into the blacked out portions of the viewed scene to create an augmented image of the viewed scene. In addition to "blacking out" portions of an image, blocking at least a portion of the light transmitted through the selectably transmissive internally focused intermediate image lens 602 is also able to, for example, filter colors or dim selected portions of the image of the scene being viewed through the lens based optical window.

In one example, a lens based optical window is able to operate to "black out" or block portions of an image of a scene being observed. For example, a scene may include a building such as a house. In that example, the subset of internally focused intermediate image lenses that convey the portion of the image containing the house are able to be determined. This determined subset of internally focused intermediate image lenses that are determined to convey the portion of the image containing the house can be configured to block transmission of light and effectively replaces the house in the image with a dark area. In various examples, an alternative image is able to be inserted into that dark area to create an augmented reality. In one example, the subset of internally focused intermediate image lenses that convey a portion of an image to be blocked is determined by processing an image captured with a separate camera that has a view of the scene similar to the view observed by the lens based optical window.

The lens based optical window control process 800 continues by controlling, at 806, the respective selectably transmissive shutter of the subset of the internally focused intermediate image lenses to at least partially block transmission of light through the subset of internally focused intermediate lenses. The lens based optical window control process 800 then determines, at 808, a revised set of internally focused intermediate image lens within the number of internally focused intermediate image lens that are to be configured to at least partially block transmission of light. In one example, portions of an image of a scene viewed through a lens based optical window are able to be changed according to various criteria, such as detected movement of the lens based optical window or elements within a scene being viewed therethrough.

The lens based optical window control process 800 continues by defining the revised set to be the subset of the internally focused intermediate image lenses to at least partially block transmission of light. Once the subset is redefined, the lens based optical window control process 800 returns to controlling, at 806, the respective selectably transmissive shutter of the subset of the internally focused intermediate image lenses to at least partially block transmission of light through the subset of internally focused intermediate lenses.

Figure 9:
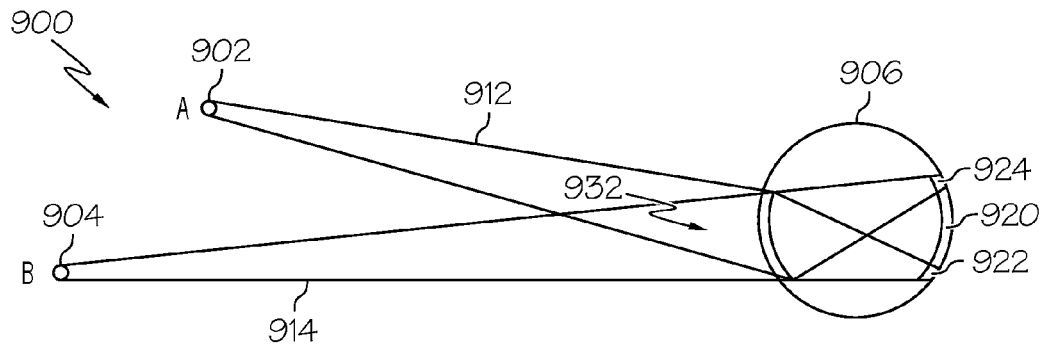
FIG. 9 illustrates a dual focusing human eye scenario, according to an example.

FIG. 9 illustrates a dual focusing human eye scenario 900, according to an example. The dual focusing human eye scenario 900 illustrates an operation of a human eye 906 when focusing on two objects that are at different distances from the eye 906. In the dual focusing human eye scenario 900, a first object "A" 902 and a second object "B" 904 are located at different distances from the eye 906, where the first object "A" 902 is closer to the eye 906 than the second object "B" 904. A first light emission 912 is emitted, or reflected, from the first object "A" 902 and a second light emission 914 is emitted, or reflected, from the second object "B" 904.

The eye 906 has a lens 932 that focuses images entering the lens on a retina 920. The person's brain processes images formed on the retina 920 and controls muscles in the eye 906 to flex the lens 932 to correctly form a focused image on the retina 920. As is understood by practitioners of ordinary skill in the relevant arts, the lens 932 of the human eye 906 is able to be bent by muscles in the eye 906, under the control of the person's brain processing images formed on the retina 920. A person viewing two or more objects that are not simultaneously focused by the lens, e.g., two or more objects located at different distances with images not having essentially parallel light rays so as to appear to be at infinite distance, will alternate the focus of his or her eyes to alternatively bring each object into focus. The person's brain incorporates information relating to the focusing of the eye's lens into the perception of the distance of the object.

In addition to autostereoscopic processing of images detected by a person's two separate eyes, the human brain processing further perceives an object's distance based upon the above described focusing of the lens 932 of each eye that brings images of different objects into focus on the retina 920. In conventional autostereoscopic systems, different images are presented to each eye of an observer, but the elements in each of those images are all brought into focus by focusing the eye's lens 932 at the same distance. This conflicts with the autostereoscopic information provided by the two different images, where the differences in the two images causes the brain to perceive various elements as appearing at different distances from the observer's eyes. The difference between the autostereoscopic effect of the two images and the focusing of the eye's lenses is able decrease the accuracy of distance perception and to cause headaches when viewing such autostereoscopic images for a long time.

In one example, internally focused double afocal intermediate image lenses in a lens based optical window have uniformly located blocking shutters and thus present the image of the blocking shutter as being at a uniform location in front of the observer's eyes. In an alternative example, as is described below, internally focused double afocal intermediate image lenses in an alternative lens based optical window are able to present blocking shutters at different locations relative to the center axis of each of the different internally focused double afocal intermediate image lenses. Presenting the blocking shutters at different locations relative to the center axis of each internally focused double afocal intermediate image lenses causes the lens of an eye viewing an image through such a lens based optical window to focus on the projection of the blocking shutters as though the blocking shutters are located at a prescribed distance in front of the observer's eyes.

Figure 10:
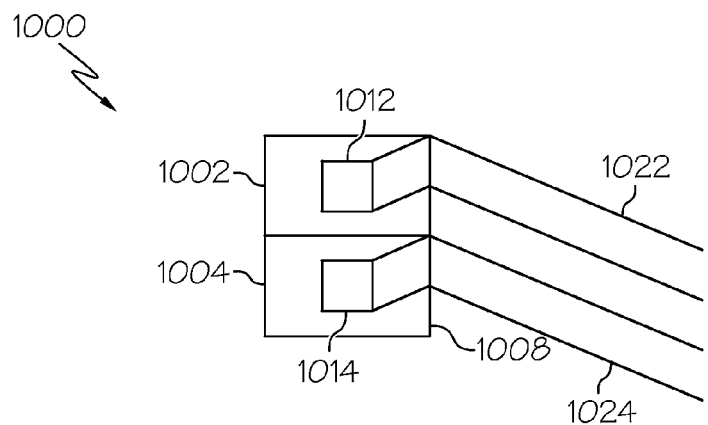
FIG. 10 illustrates a two internally focused double afocal intermediate image lenses with uniformly located blocking shutters, according to one example.

FIG. 10 illustrates a two internally focused double afocal intermediate image lenses with uniformly located blocking shutters 1000, according to one example. The two internally focused double afocal intermediate image lens with uniformly located blocking shutters 1000 depicts two internally focused double afocal intermediate image lenses that are mounted adjacent to one another.

A first internally focused double afocal intermediate image lens 1002 and a second internally focused double afocal intermediate image lens 1004 are depicted in the two internally focused double afocal intermediate image lenses with uniformly located blocking shutters 1000. The first internally focused double afocal intermediate image lens 1002 has a first blocking shutter 1012 and the second internally focused double afocal intermediate image lens 1004 has a second blocking shutter 1014. The first blocking shutter 1012 and the second blocking shutter 1014 are located at similar positions relative to the center axis of its respective internally focused double afocal intermediate image lens.

A first projection 1022 is a projection of the first blocking shutter 1012 and a second projection 1024 is a projection of the second blocking shutter 1014. Because the first blocking shutter 1012 and the second blocking shutter 1014 are located at similar positions relative to the center axis of their respective internally focused double afocal intermediate image lens, the first projection 1022 and the second projection 1024 are projected as being parallel to each other. An observer observing these two parallel projections focuses on the blocking shutters as though they are located at a substantially infinite distance.

Figure 11:
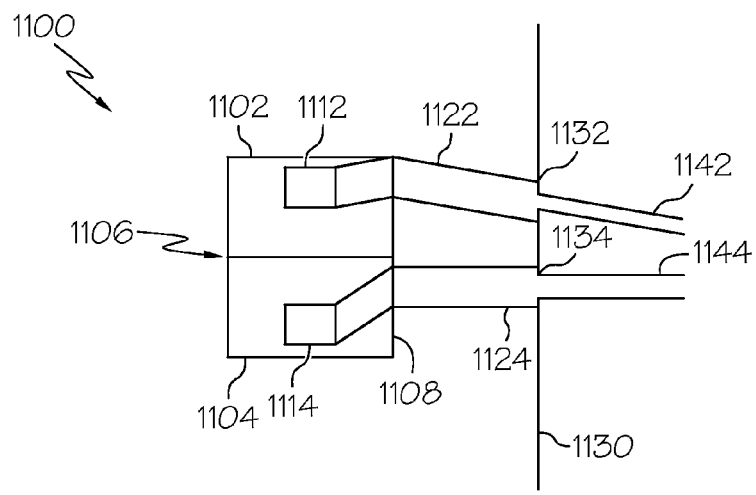
FIG. 11 illustrates a two internally focused double afocal intermediate image lenses with differently located blocking shutters, according to one example.

FIG. 11 illustrates a two internally focused double afocal intermediate image lenses with differently located blocking shutters 1100, according to one example. The two internally focused double afocal intermediate image lens with differently located blocking shutters 1100 depicts two internally focused double afocal intermediate image lenses that are mounted adjacent to one another. These two internally focused double afocal intermediate image lenses each has a respective selectably transmissive blocking shutter that is able to selectively pass or block light that enters the front side 1106 of a particular internally focused double afocal intermediate image lens so as to cause the light to traverses and exit the back side 1108 or be blocked.

The two internally focused double afocal intermediate image lenses with differently located blocking shutters 1100 depicts a first internally focused double afocal intermediate image lens 1102 and a second internally focused double afocal intermediate image lens 1104. The first internally focused double afocal intermediate image lens 1102 has a first offset shutter 1112 and the second internally focused double afocal intermediate image lens 1104 has a second offset shutter 1114. The first offset shutter 1112 and the second offset shutter 1114 are selectably transmissive blocking shutters that are located in each lens at different positions relative to the axis of its respective internally focused double afocal intermediate image lens, i.e., they are offset from the axis of their respective lens. In one example, each internally focused double afocal intermediate image lens has an array of selectably transmissive blocking shutters located at different positions relative to that lens' axis and the position of the blocking shutter relative to the center axis of the lens is able to be modified by selecting one shutter within the array of selectably transmissive blocking shutters.

A first projection 1122 is a projection of the first offset blocking shutter 1112 and a second projection 1124 is a projection of the second offset blocking shutter 1114. Because the first offset blocking shutter 1112 and the second offset blocking shutter 1114 are located at different positions relative to the center axis of their respective internally focused double afocal intermediate image lens, the first projection 1122 and the second projection 1124 are projected at different angles and therefore arrive at an observer's eye as though they are located at a defined distance from the eye, instead of appearing to be focused at infinity as is the case with the two internally focused double afocal intermediate image lenses with uniform location blocking shutters 1000 discussed above.

In one example, a blocking aperture 1130 is placed adjacent to or beyond the back side 1108 of the internally focused double afocal intermediate image lenses. The blocking aperture 1130 has a respective opening for each internally focused double afocal intermediate image lens. In the illustrated example, the blocking aperture has a first opening 1132 and a second opening 1134. The first opening 1132 is behind the first internally focused double afocal intermediate image lens 1102 and the second opening 1134 is behind the second internally focused double afocal intermediate image lens 1104. In one example, the openings are aligned with the center axis of its respective lens. In one example, a blocking aperture 1130 is used if the apertures of the lenses are big compared to the opening of the iris of an observer's eye. In one example, the openings in the blocking aperture are sized to be on the order of a person's pupil or smaller. In another example, the several lenses of a lens based optical window or an image augmenting window are sized to be on the order of a person's pupil or smaller. Projecting images of the blocking shutter through an opening of the blocking aperture 1130 allows the eye of an observer to better focus on the content of multiple lenses in a manner similar to that discussed above in the dual focusing human eye scenario 900. This improved focus allows the observer to see sharper images.

Figure 12:
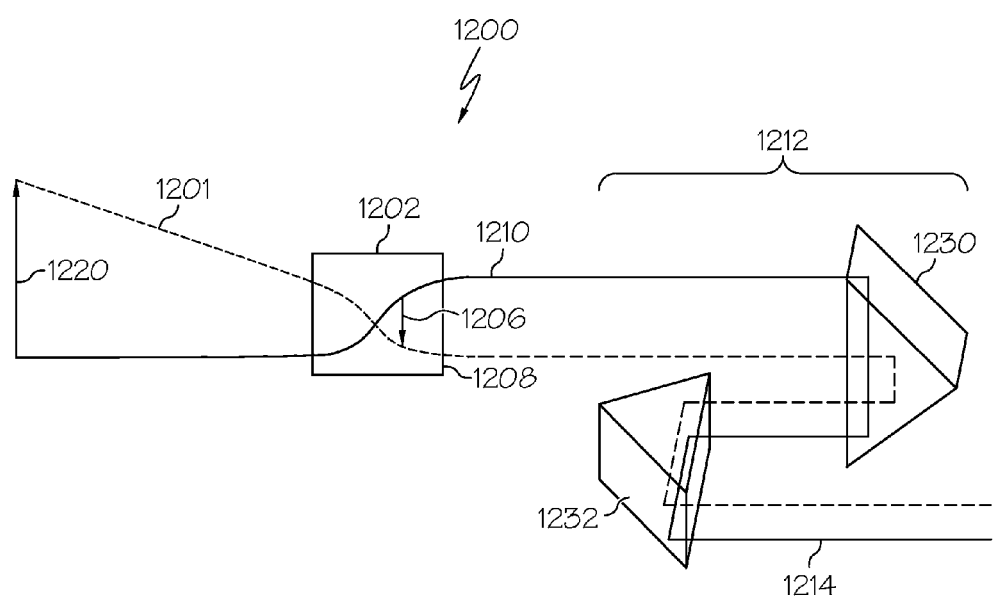
FIG. 12 illustrates an alternative internally focused afocal lens operation, according to one example.

FIG. 12 illustrates an alternative internally focused afocal lens operation 1200, according to one example. The alternative internally focused afocal lens operation 1200 depicts an alternative internally focused afocal lens 1202 that creates one internally focused image 1206 of a scene 1220. In one example, the alternative internally focused afocal lens 1202 is constructed of a GRIN material, as is described above. The GRIN material of the alternative internally focused afocal lens 1202 refracts light to create the one internally focused image 1206 that is inverted relative to the scene 1220. The one internally focused image 1206 is formed in one example, within the GRIN material. The alternative internally focused afocal lens 1202 of one example includes GRIN material that extends beyond the internally focused image 1206 and refracts that light into an inverted afocal projection 1210. In one example, the alternative internally focused afocal lens operation 1200 forms no second focused image and therefore the light exiting the back 1208 of the alternative internally focused afocal lens 1202 defines an inverted image of the light of the scene 1220 entering the alternative internally focused afocal lens 1202.

The inverted afocal projection 1210 of one example is provided to an optical structure, such as a prism structure 1212 or other optical structure that operates by one or more of refraction, reflection, or other optical properties, to invert the light received through the inverted afocal projection 1210 to form a non-inverted afocal projection 1214. The illustrated prism structure 1212 includes a double Porro prism structure that consists of a first Porro prism 1230 and a second Porro prism 1232. The operation of a double Porro prism is known to project an image that is inverted relative to the image received by the double Porro prism structure. As is understood in the field of optics, other prism structures are able to be used by various examples, such as Porro-Abbe prisms or Abbe-Koenig prisms.

In further examples, the optical structure, such as a structure including a prism structure 1212, an alternative prism structure that is able to include mirrors, other structures, or any combination of those structures, are able to project a focused image that can be formed at a focal plane behind the alternative internally focused afocal lens 1202.

A lens based optical window, such as those discussed above, is able to be formed from a number of alternative internally focused afocal lens 1202. Further, a selectably transmissive shutter, such as is described above and formed of one or more liquid crystal cells, is able to be placed in the plane of the single internally focused image 1206 to allow light representing the image to pass through that alternative internally focused afocal lens 1202, or to be blocked. As discussed above, a lens based optical window containing a number of such alternative internally focused afocal lenses, each similar to the above described alternative internally focused afocal lens 1202, each with a respective selectably transmissive shutter, is able to selectably block all or portions of an image being viewed by an observer behind the lens based optical window. As described with regards to the two internally focused double afocal intermediate image lenses with differently located blocking shutters 1100, a number of selectably transmissive shutters are able to be placed at different locations or distances from the center axis of an alternative internally focused afocal lens 1202 so as to form blocking shutters at different locations relative to the center axis of the lens.

Figure 14:
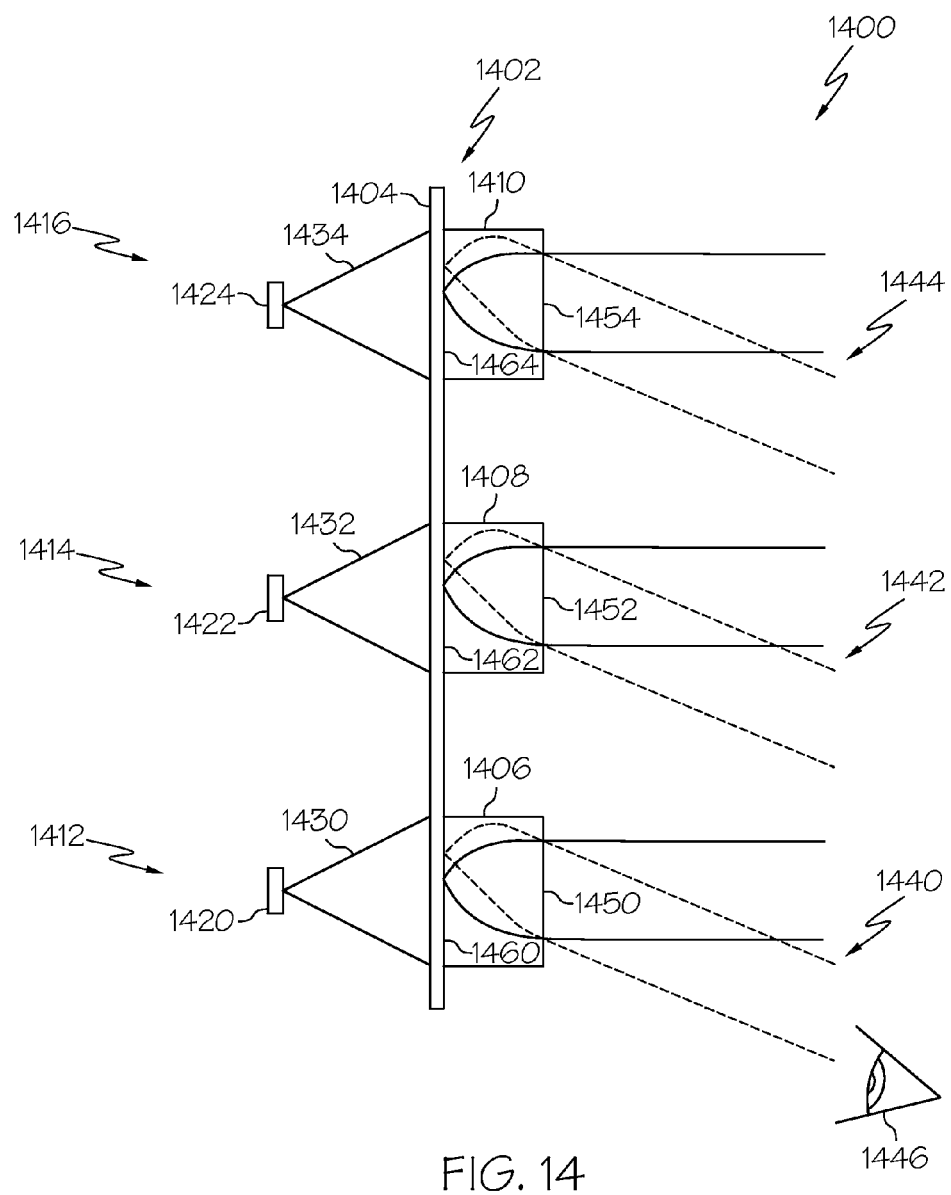
FIG. 14 illustrates an arrangement of controllable point light sources, according to one example.

FIG. 14 illustrates an arrangement of controllable point light sources 1400, according to one example. The arrangement of controllable point light sources 1400 depicts three controllable point light sources 1402, which includes a first controllable point light source 1412, a second controllable point light source 1414, and a third controllable point light source 1416. In general, a display is built using a two-dimensional array of controllable point light sources. Light passing through each controllable point light source is controlled by a respective controllable shutter. In the illustrated example, the respective controllable shutters are part of a liquid crystal panel 1404 that has an individually controllable liquid crystal cell for each controllable point light source. In the illustrated example, each controllable point light source is able to project an afocal light point towards an observer 1446. In one example, all of the controllable point light sources have a similar design. The following discussion focuses on the first controllable point light source 1412 as an example of the other controllable point light sources, which have similar designs and operating characteristics.

The first controllable point light source 1412 includes a first light emitter 1420 that emits a first light field 1430. The first light field 1430 illuminates a first controllable shutter 1460. The first controllable shutter 1460 in one example is a liquid crystal cell that is able to be configured to allow light to pass, block all light, or attenuate light that passes there through.

The first controllable point light source 1412 further has a first projection lens 1406. The first projection lens 1406 in one example is a GRIN lens that projects light entering the first projection lens 1406 from the first controllable shutter 1460 into an afocal light projection 1440. The afocal light projection 1440 is a projection of a light image formed on the first controllable shutter 1460, which is located at a focal point of the first projection lens 1406 and is a source focal plane in this example. In the illustrated example, the light projection 1440 is a light field with a uniform or contoured intensity across the first controllable shutter 1460. Therefore, the afocal light projection 1440 is a beam of light that is emitted without net divergence and that can be viewed through a focusing lens, such as a person's eye or a camera lens, of an observer 1446.

The arrangement of controllable point light sources 1400 includes a number of controllable point light sources, such as the first controllable point light source 1412, the second controllable point light source 1414, and the third controllable point light source 1416. These individual controllable point light sources are each able to be viewed as a "pixel" of light by the observer 1446 and a variable image is able to be formed by operating the respective controllable shutter of each controllable point light source to allow, stop, or attenuate light transmission therethrough. In one example, each controllable point light source is able to have a color filter so each controllable point light source is a sub-pixel that forms a multi-color pixel that allows color images to be projected to the observer 1446.

Similar to the above described first controllable point light source 1412, the second controllable point light source 1412 has a second light emitter 1422 that emits a second light field 1432. The second light field 1432 illuminates a second controllable shutter 1462, which in one example is a liquid crystal cell that is part of a liquid crystal panel 1404. Light passing through the second controllable shutter 1462 passes through a second projection lens 1408, which in one example is a GRIN lens that projects a light image at the second controllable shutter 1462 into a second afocal light projection 1442 viewed by the observer 1446. In one example, the second afocal light projection 1442 appears as an image of the light passing through the second controllable shutter, where that image is focused at infinity.

The third controllable point light source 1416 has a third light emitter 1424 that emits a third light field 1434 that illuminates a third controllable shutter 1464 that is part of the liquid crystal panel 1404. Light passing through the third controllable shutter 1464 passes through a third projection lens 1410, which in one example is a GRIN lens that projects light into a third afocal light projection 1444 of the light image that is viewed by the observer 1446.

In the above description, each combination of a light emitter and a controllable shutter is referred to as a controllable light emitter. The controllable light emitter in various examples are able to be configured to emit varying amounts of light, from a full intensity level based on the design of the controllable light emitter to a lower intensity level that is able in some cases to be mostly or completely dark. A controllable light emitter utilized in further examples is able to be, for example, one of an Organic LED (OLED), a controllable laser beam emitter, or any light emitter that has a controllable output intensity. As is described above, a controllable light emitter is able to have a respective light source lens that refracts light from a respective controllable light emitter to emit an afocal projection of the respective controllable light emitter as projected light.

In further examples, the arrangement of controllable point light sources 1400 is able to include alternative controllable point light sources. In one example, two or more controllable point light sources that use liquid crystal cells, such as those described above, are able to use a shared light emitter. For example, an alternative design is able to replace the above described first controllable point light source 1412, second controllable point light source 1414, the third controllable point light source 1416 with a single light source that illuminates the first controllable shutter 1460, the second controllable shutter 1462 and the third controllable shutter 1464.

In another example, an alternative arrangement of controllable point light sources is able to replace the illustrated combination of the first light emitter 1420 and the first controllable shutter 1460 with a controllable first Organic Light Emitting Diode (OLED). The first OLED is able to be adjacent to the first projection lens 1406 so that light emitted by the first OLED is projected into a first afocal light projection 1440. In various examples, each projection lens is able to be adjacent to a monochrome light source, or each projection lens, such as the first projection lens 1406 is able to be adjacent to and project light from multiple controllable light sources. For example, a projection lens is able to be associated with a single pixel that is projected to the observer 1446, and different colored sub-pixels of that single pixel are able to be located at the focal plane of the projection lens. In further examples, each projection lens is able to have multiple controllable light sources that form multiple pixels that are projected to the observer 1446.

An alternative arrangement of controllable point light sources is able to be constructed of a matrix of Organic LEDs (OLEDs) that replace the above described controllable shutters for the controllable light sources and also replaces the described backlights. The use of OLEDs in an alternative arrangement of controllable point light sources obviates a need for one or more backlight and the associated controllable shutter for each controllable point light source.

Yet another alternative arrangement of controllable point light sources is able to be realized by including a laser projection system that generates modulated color laser beams that are directed by one or more controllable mirrors. In such alternatives, a one-axis or a two-axis controllable mirror is used to reflect a laser beam created by a modulated color laser into a desired direction. In some examples, the reflected modulated color laser beam is passed through a lens or other optical structure to prepare the reflected modulated color laser beam for projection or other uses. An example of a controllable mirror is a Micro Electro Mechanical Systems (MEMS) that has a movable mirror that is able to be controllably positioned to precisely direct a reflected laser beam in a desired direction. One or more lasers are able to be used in such an alternative system that produce, for example, monochrome light or light covering all or part of the visible light spectrum.

A modulated color laser as discussed herein is a controllable light source that is able to generate a beam of light with a controllable intensity and color spectrum content. An example of a modulated color laser includes three lasers that each generate a primary color used to create an image, and light of various colors and intensities is able to be generated by individually controlling the intensity of light produced by each laser and combining the produced light to create a light beam of a desired color and intensity. In one example, the intensity and color of the light generated by the modulated color laser is able to be varied with a speed that allows the beam to be scanned across an area and varying of the light intensity and color allows independent selection of intensity and color for each picture element, or pixel, presented in the area.

Figure 15:
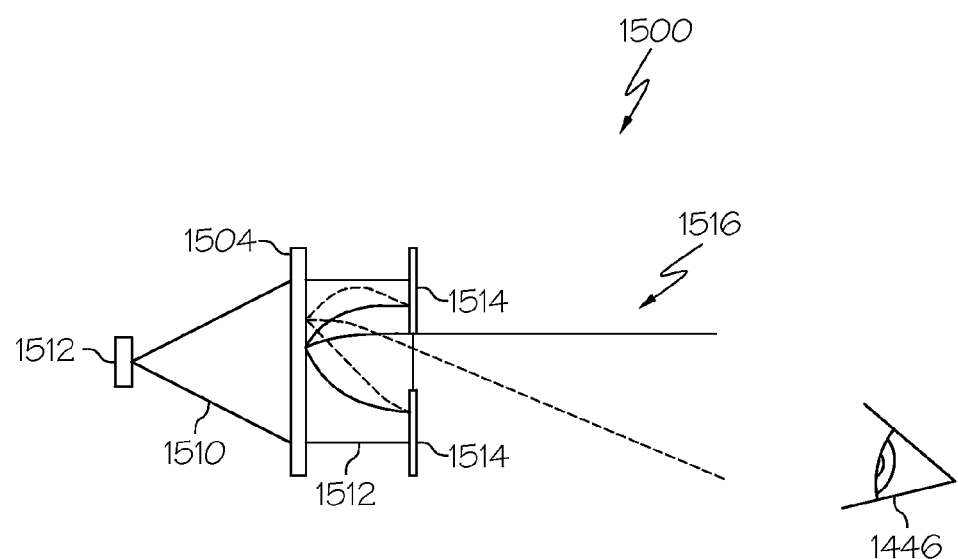
FIG. 15 illustrates a restricted aperture controllable light source, according to one example.

FIG. 15 illustrates a restricted aperture controllable light source 1500, according to one example. The restricted aperture controllable light source 1500 is similar to the controllable light sources described above with regards to the arrangement of controllable point light sources 1400. In one example, an alternative arrangement of controllable point light sources is able to consist of a number of restricted aperture controllable light sources 1500. An example of an alternative arrangement of controllable point light sources that includes restricted aperture controllable light sources 1500 is a design that accommodates projection lenses of the individual controllable light sources that each has an aperture larger than the expected aperture of the observer 1446. The expected aperture size of the observer 1446 is able to be based on an aperture size corresponding to, for example, the iris of a person's eye or an aperture of a lens of a camera that is expected to view the projected images. By including a restrictive aperture at the output of a relatively large lens, the observer 1446 is able to better focus on the projected images of the multiple lenses of the controllable point light source. By providing a smaller aperture at the output of the projection lenses, the observer 1446 is able to view more clearly focused and sharper images created by the controllable point light sources.

Similar to the above described controllable light sources, the restricted aperture controllable light source 1500 has a light emitter 1502 that emits a light field 1510. The light field 1510 illuminates a controllable shutter 1504, which in one example is a liquid crystal cell. Light passing through the controllable shutter 1504 passes through a projection lens 1512, which in one example is a GRIN lens that projects light into a second afocal light projection. In addition to the above described controllable light sources, the restricted aperture controllable light source 1500 includes a restricting aperture 1514. The restricting aperture 1514 causes a restricted aperture afocal light projection 1516. In one example, the restricting aperture 1514, and the aperture of the restricted aperture afocal light projection 1516, is dimensioned to be commensurate with the aperture of the observer 1446 and is therefore able to be more sharply focused.

Figure 16:
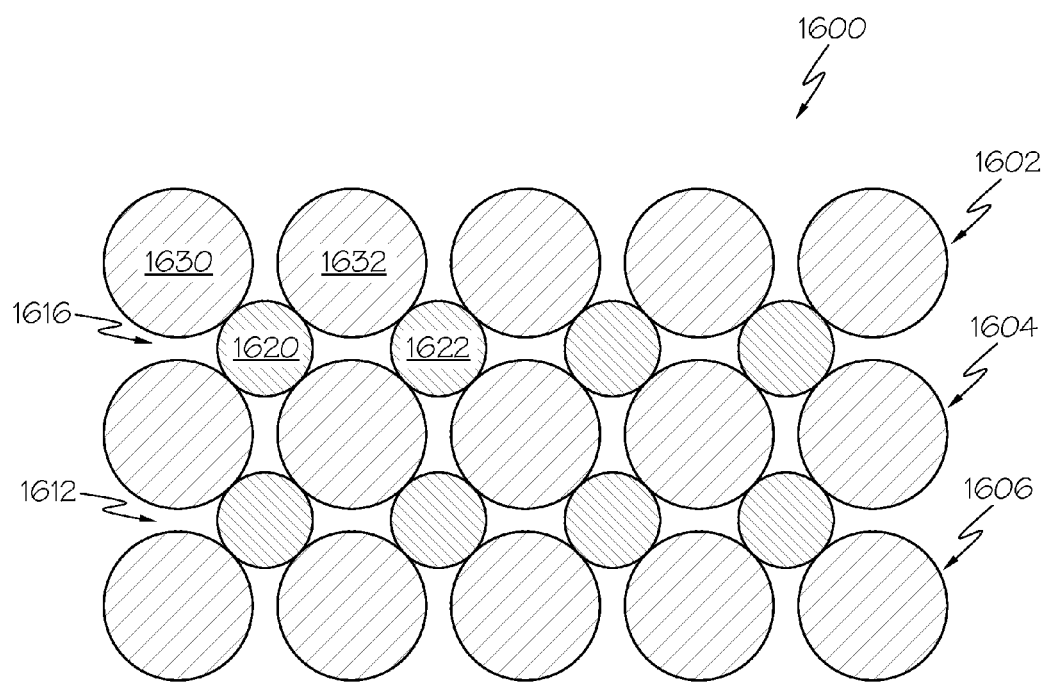
FIG. 16 illustrates an integrated selectably transmissive internally focused intermediate image lens and controllable light source array, according to one example.

FIG. 16 illustrates an integrated selectably transmissive internally focused intermediate image lens and controllable light source array 1600, according to one example. The integrated selectably transmissive internally focused intermediate image lens and controllable light source array 1600 depicts an intermixed array of selectably transmissive internally focused intermediate image lenses, as are described above with regards to FIGS. 5 and 6 and controllable point light sources, such as are described above with regards to FIG. 14. In one example, the integrated selectably transmissive internally focused intermediate image lens and controllable light source array 1600 operates as an image augmenting window that allows an observer to view an image of a scene while portions of the image of the scene is able to be removed and other image components are able to be added to the view presented to the observer.

The integrated selectably transmissive internally focused intermediate image lens and controllable light source arrangement 1600 shows a first row of selectably transmissive internally focused intermediate image lenses 1602, a second row of selectably transmissive internally focused intermediate image lenses 1604, and a third row of selectably transmissive internally focused intermediate image lenses. Each of these three rows of selectably transmissive internally focused intermediate image lenses contains columns of selectably transmissive internally focused intermediate image lenses. As an example of the columns, a first column of selectably transmissive internally focused intermediate image lenses 1630 and a second column of selectably transmissive internally focused intermediate image lenses 1632 are shown. The arrangement of selectably transmissive internally focused intermediate image lenses within integrated selectably transmissive internally focused intermediate image lens and controllable light source arrangement 1600 form a lens based optical window, such as is described above with regards to FIG. 7.

The integrated selectably transmissive internally focused intermediate image lens and controllable light source arrangement 1600 further includes an arrangement of controllable point light sources that are interleaved between the selectably transmissive internally focused intermediate image lenses. The integrated selectably transmissive internally focused intermediate image lens and controllable light source arrangement 1600 shows a first row of controllable point light sources 1610 and a second row of controllable point light sources 1612. The rows of controllable light sources consist of columns of controllable light sources, such as the depicted first column of controllable light sources 1620 and the second column of controllable light sources 1622.

In operation, each of the selectably transmissive internally focused intermediate image lenses is able to be individually controlled to partially or completely block the light being passed therethrough. Configuring some of the selectably transmissive internally focused intermediate image lens to block or attenuate the light passing through those lenses causes parts of a scene being viewed through the lens based optical window formed by the integrated selectably transmissive internally focused intermediate image lens and controllable light source arrangement 1600 to be blocked. The arrangement of controllable point light sources that are interleaved between the selectably transmissive internally focused intermediate image lenses are able to be configured to emit lights at selected portions of the integrated selectably transmissive internally focused intermediate image lens and controllable light source arrangement 1600. The light emitted by the controllable light sources is able to be collocated with portions of the image viewed through the selectably transmissive internally focused intermediate image lenses of the integrated selectably transmissive internally focused intermediate image lens and controllable light source arrangement 1600 to augment or replace the viewed image.

The controllable light sources, as depicted above in the first row of controllable point light sources 1610 and the second row of controllable point light sources 1612, are able to be any type controllable point light sources. Each controllable light source is able to have one or more Liquid Crystal (LC) cells that is or are illuminated by a backlight that is either associated with just that controllable point light source or that illuminates a number of controllable point light sources. Further examples are able to include controllable point light sources that each consists of one or more Organic LEDs (OLEDs). In yet another example, a laser projection system, as is discussed above, is able to serve as the controllable point light sources.

Figure 17:
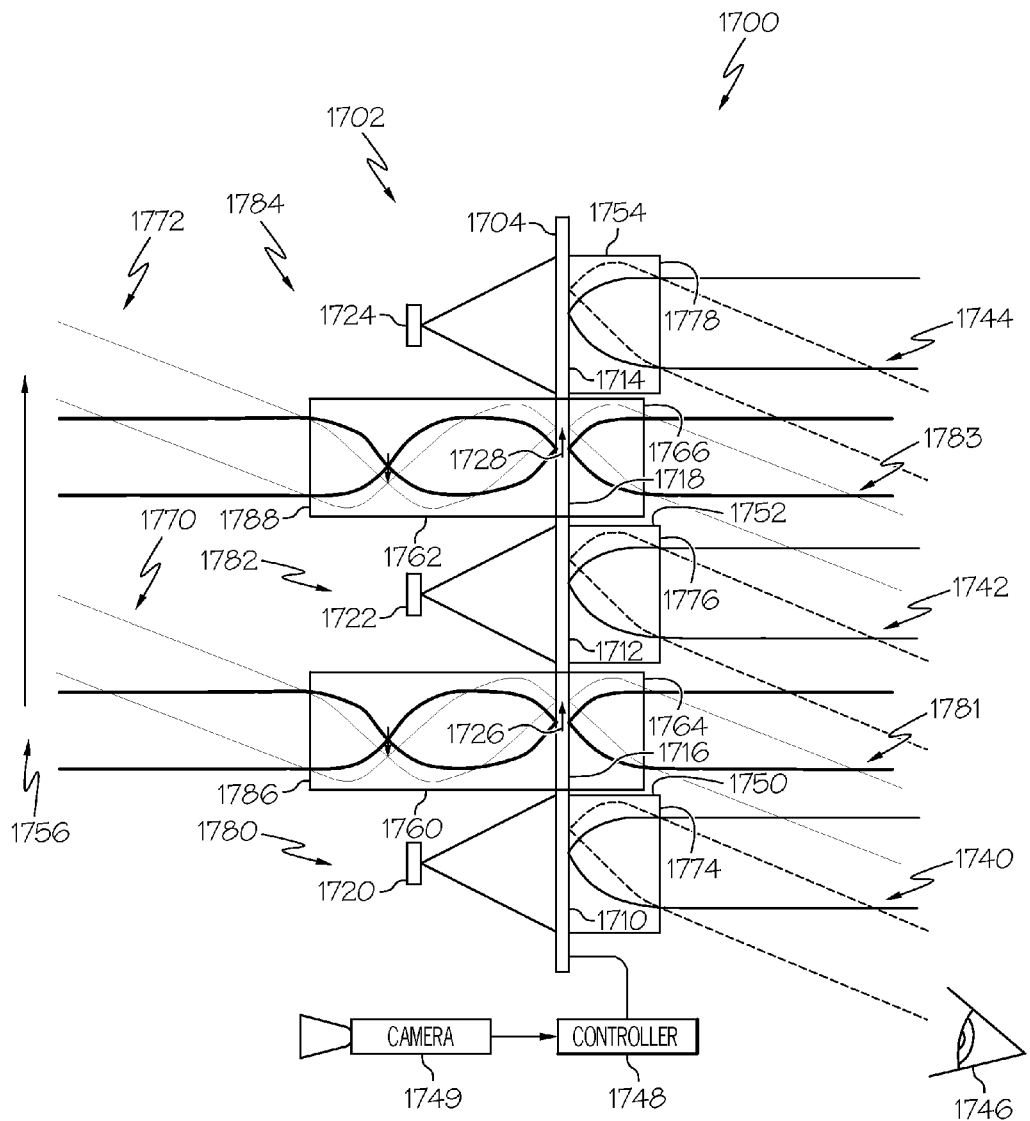
FIG. 17 illustrates an augmented image optical window operation, according to one example.

FIG. 17 illustrates an augmented image optical window operation 1700, according to one example. The augmented image optical window operation 1700 includes a side view of an image augmenting window 1702. The side view of the image augmenting window 1702 in this example is a side view of the integrated selectably transmissive internally focused intermediate image lens and controllable light source arrangement 1600, discussed above. As discussed above, the integrated selectably transmissive internally focused intermediate image lens and controllable light source arrangement 1600 is an example of an image augmenting window that includes a number of selectably transmissive internally focused intermediate image lens and controllable light sources. The image augmenting window 1702 is able to receive light from a scene 1756, selectively darken or block portions of an image of the scene 1756 and then selectively add image portions to the image of the scene 1756 to create an augmented image of the scene 1756 that includes portion of the actual scene 1756 and created image portions. A controller 1748 of one example determines which portion of the image of the scene 1756 to darken or block, and also determines image portions to add to the image presented to an observer 1746 of the augmented image.

In one example, the image augmenting window 1702 includes a camera 1749 that is able to capture an image of the scene 1756. The camera 1749 provides the captured image of the scene 1756 to the controller 1748. The controller 1748 performs image processing of the image of the scene 1756 and determines, based upon various criteria, portions of the image of the scene 1756 to block, and also image portions to add to the augmented image presented to the observer 1746. In one example, the controller 1748 is able to dynamically track portions of the captured image of the scene 1756 and modify the portions of the image to block and the portions of the image to add based upon changes in the scene 1756 or orientation of the image augmenting window 1702.

The image augmenting window 1702 has a number of internally focused intermediate image lenses that comprise a number of selectably transmissive internally focused intermediate image lenses. In the illustrated example, each of the internally focused intermediate image lenses of the image augmenting window 1702 is a selectably transmissive internally focused intermediate image lens. The depicted selectably transmissive internally focused intermediate image lenses include a first selectably transmissive internally focused intermediate image lens 1760 and a second selectably transmissive internally focused intermediate image lens 1762. Further depicted in the image augmenting window 1702 are a first controllable light source 1780, a second controllable light source 1782, and a third controllable light source 1784. These depicted selectably transmissive internally focused intermediate image lens and controllable light sources in one example are a portion of an image augmenting window 1702 that is made up of a larger array of such interleaved components. In one example, the light being passed through each of the selectably transmissive internally focused intermediate image lenses and the light emitted by each of the controllable light sources is controlled by a respective controllable shutter. These respective controllable shutters are included within a liquid crystal panel 1704 that is formed on a single panel. The individual controllable shutters of the liquid crystal panel 1704 are controlled by a controller 1748 to create desired images and visual effects.

The three depicted controllable light sources, i.e., the first controllable light source 1780, the second controllable light source 1782 and the third controllable light source 1784 operate similarly in this example. The first controllable light source 1780 has a first light source 1720 that illuminates a first controllable source shutter 1710 within the liquid crystal panel 1704. The first controllable source shutter 1710 is controlled by the controller 1748 to pass or block light that is emitted by the first light source 1720. Light that does pass through the first controllable source shutter 1710 passes through to the first projection lens 1750. As discussed above with regards to arrangement of controllable point light sources 1400, the first projection lens 1750 projects a first afocal projection 1740 of the image formed at its front, which is an image of the first controllable source shutter 1710. The first afocal projection 1740 of the first controllable source shutter 1710 allows the "dot" of light created by the light passing through the first controllable source shutter 1710 to be viewed by the observer 1746 as a clearly focused and sharp "dot" that appears to be at infinite distance from the observer.

The second controllable light source 1782 and the third controllable light source 1784 operate in a manner similar to that described above for the first controllable light source 1780. A second light source 1722 and a third light source 1724 respectively illuminate a second controllable source shutter 1712 and a third controllable source shutter 1714. Light that passes through these controllable source shutters passes through a second projection lens 1752 and a third projection lens 1754, respectively, to create a second afocal projection 1742 and a third afocal projection 1744 of images present at the front of those lenses. These afocal projections contain the light that passes through the respective controllable shutter, but with the respective controllable shutter focused at infinity.

The controllable light sources, such as the first controllable light source 1780, the second controllable light source 1782 and the third controllable light source 1784, are able to be any type controllable point light sources. As discussed above, examples have controllable light sources where each controllable light source has one or more Liquid Crystal (LC) cells that is or are illuminated by a backlight that is either associated with just that controllable light source or that illuminates a number of controllable light sources. Further examples are able to include controllable light sources that each consists of one or more Organic LEDs (OLEDs). In yet another example, a laser projection system, as is discussed above, is able to serve as some or all of the controllable light sources in an image augmenting window.

The first selectably transmissive internally focused intermediate image lens 1760 depicted in the side view of the augmented image optical window 1700 operates in a manner similar to that discussed above for the selectably transmissive internally focused intermediate image lens operation 600. Incoming light rays 1770 from a scene 1756 are received at a selectably transmissive internally focused intermediate image lens front surface 1786 and are refracted and focused into a first intermediate image 1726 that is located at a first intermediate image lens shutter 1716. The first intermediate image lens shutter 1716 is able to selectably block or pass the light that contains the focused first intermediate image. When the first intermediate image lens shutter 1716 is configured to pass some or all of the light containing the first intermediate image 1726, the first selectably transmissive internally focused intermediate image lens 1760 projects a first afocal projection 1781 of the first intermediate image 1726 out of the first selectably transmissive internally focused intermediate image lens back side 1764. The first afocal projection 1781 in one example contains an image of the scene 1756 with light rays having no net divergence. The first afocal projection 1781 appears to the observer 1746 to be focused at infinity.

The second selectably transmissive internally focused intermediate image lens 1762 operates in a manner similar to the first selectably transmissive internally focused intermediate image lens 1760. For example, incoming light rays 1772 from the scene 1756 are received at a second selectably transmissive internally focused intermediate image lens front surface 1788 and are refracted and focused into a second intermediate image 1728 that is located at a second intermediate image lens shutter 1718. The second intermediate image lens shutter 1718 is able to selectably block or pass the light that contains the focused first intermediate image. When the second intermediate image lens shutter 1718 is configured to pass some or all of the light containing the second intermediate image 1728, the second selectably transmissive internally focused intermediate image lens 1762 projects a second afocal projection 1783 of the second intermediate image 1728 out of the second selectably transmissive internally focused intermediate image lens back side 1766. The second afocal projection 1783 appears to the observer 1746 to also be focused at infinity.

As noted above, the first afocal projection 1781 and the second afocal projection 1783 of the scene 1756 are able to be effectively viewed by an observer 1746 and appear to be focused at a large distance from the image augmenting window 1702. The generally narrow aperture of the selectably transmissive internally focused intermediate image lenses results in these lenses having a large depth-of-field that allows objects in the scene 1756 to be clearly observed and in focus when they are located within a large range of distances from the image augmenting window 1702. The observer 1746 views images of the scene 1756 as though they are focused at a long distance from the image augmenting window 1702. Light produced by the controllable light sources of the image augmenting window 1702 also appear to be focused at a long distance from the image augmenting window 1702. The image augmenting window 1702 therefore produces afocal projections of images of the scene 1756 through the selectably transmissive internally focused intermediate image lens and afocal projections of light emitted by the controllable point light sources that both appear to be focused at a long distance from the image augmenting window 1702, and therefore appear to be in focus with each other as they are simultaneously viewed by the observer 1746.

Figure 18:
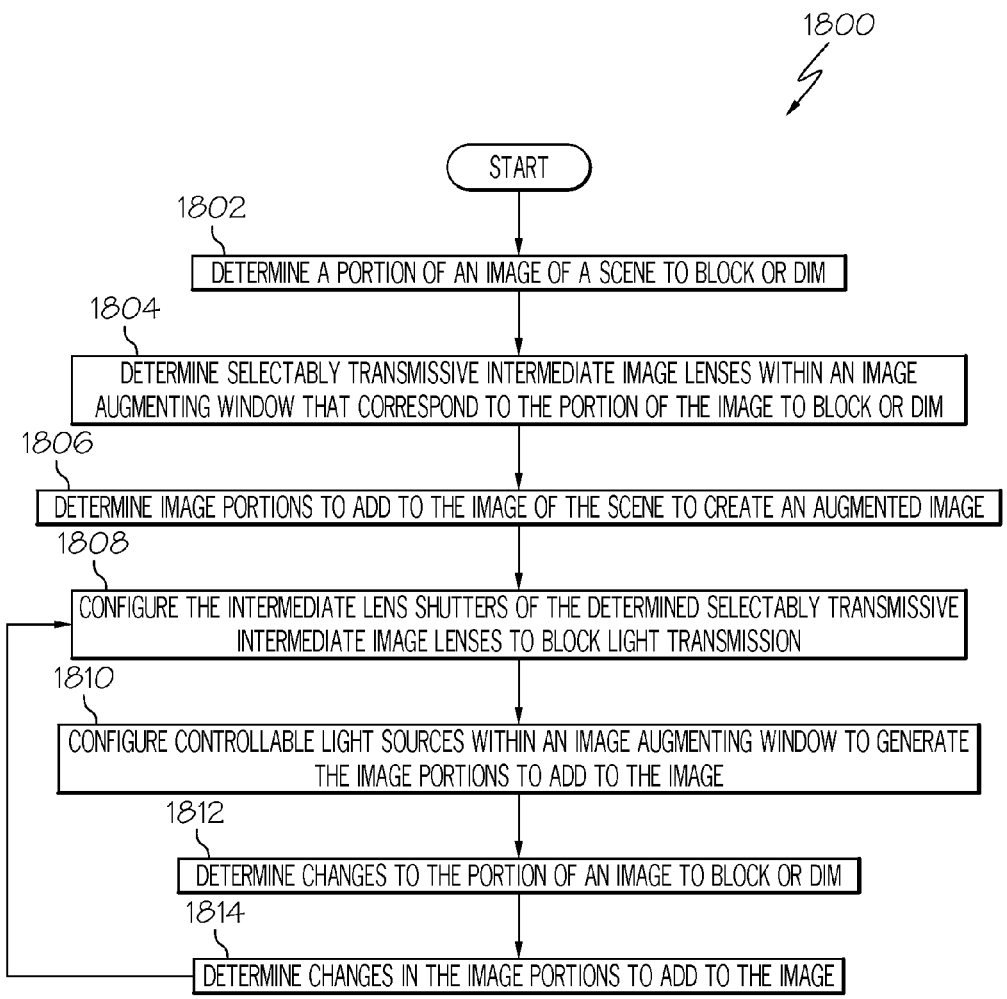
FIG. 18 illustrates an image augmentation processing flow, according to one example.

FIG. 18 illustrates an image augmentation processing flow 1800, according to one example. The image augmentation processing flow 1800 in one example is performed by the controller 1748 of the image augmenting window 1702 discussed above with regards to FIG. 17. The image augmentation processing flow 1800 of one example processes captured images of a scene, determines which portions of the image are to be optically blocked or dimmed, determines new image components to be added to the image of the scene to create an augmented image of the scene. The following description incorporates the system components of the image augmenting window 1702, described above with regards to FIG. 17, to describe the operation of the image augmentation processing flow 1800.

The image augmentation processing flow 1800 begins by determining, at 1802, a portion of an image of a scene to block or dim. In one example, an image of a scene 1756 is captured by camera 1749 and provided to a controller 1748. Controller 1748 determines portions, such as areas of pixels in the captured image, that are to be dimmed or optically blocked in the image presented to the observer 1746.

The image augmentation processing flow 1800 continues by determining, at 1804, selectably transmissive internally focused intermediate image lenses within an image augmenting window that correspond to the portion of the image to block. As described above, each selectably transmissive internally focused intermediate image lenses include controllable shutters that are individually controllable to optically block or attenuate light passing through the individual selectably transmissive internally focused intermediate image lenses. In one example, the selectably transmissive internally focused intermediate image lenses have dimensions comparable to the size of an image pixel, thereby allowing precise selection of image portions to block or dim. In one example, determining selectably transmissive internally focused intermediate image lenses within an image augmenting window that correspond to the portion of the image to block is an example of determining a subset of the at least one selectably transmissive internally focused intermediate image lens that are to at least partially block transmission of light.

The image augmentation processing flow 1800 further determines, at 1806, image portions to add to the image of the scene to create an augmented image. Such image portions are able to replace image portions that are optically blocked by the selectably transmissive internally focused intermediate image lenses that are selected as described above. In further examples, the image portions are able to be added to the live image of the scene 1756 without those portions of the live image being blocked. In one example, determining image portions to add to the image of the scene to create an augmented image is an example of determining a subset of controllable light sources within the at least one controllable light source that are to emit light to augment the focused image The image augmentation processing flow 1800 continues by configuring, at 1808, intermediate lens shutters of the determined selectably transmissive internally focused intermediate image lenses to block light transmission. As discussed above, the selectably transmissive internally focused intermediate image lenses of the image augmenting window 1702 include individually controllable light shutters that can be controlled to optically block or attenuate light conveyed through each selectably transmissive internally focused intermediate image lens. In one example, configuring intermediate lens shutters of the determined selectably transmissive internally focused intermediate image lenses to block light transmission is an example of controlling respective selectably transmissive shutters of the subset of the internally focused intermediate image lenses to at least partially block transmission of light therethrough.

The image augmentation processing flow 1800 continues by configuring, at 1810, controllable light sources within an image augmenting window 1702 to generate the image portions to add to the image. Each controllable light source is able to have a dimension consistent with the size of an individual pixel presented to an observer 1746, or each controllable light source is able to include multiple pixels of the image that is presented in the observer 1746. In one example, configuring controllable light sources within an image augmenting window 1702 to generate the image portions to add to the image is an example of control the respective controllable light sources of the subset of controllable light sources to emit light.

Once an image is presented to the observer 1746, the image augmentation processing flow 1800 continues in time by determining, at 1812, changes to the portion of an image to block or dim. These changes are able to be based upon motion of objects within the scene 1756, movement of the image augmenting window 1702, or a desired change in the augmentation to be made in the image presented to the observer 1746. In one example, determining changes to the portion of an image to block or dim is an example of determining a revised set of selectably transmissive internally focused intermediate image lens within the at least one selectably transmissive internally focused intermediate image lens that are to at least partially block transmission of light, and defining the revised set to be the subset of the at least one selectably transmissive internally focused intermediate image lens to at least partially block transmission of light.

The image augmentation processing flow 1800 also determines, at 1814, changes in the image portions to add to the image. These changes are also based upon the above reasons, i.e., motion of objects within the scene 1756, movement of the image augmenting window 1702, or a desired change in the augmentation to be made in the image presented to the observer 1746. In one example, determining changes in the image portions to add to the image is an example of determining a revised subset of controllable light sources within the at least one controllable light source that are to emit light to augment the focused image.

The image augmentation processing flow 1800 then returns to configuring, at 1808, intermediate lens shutters of the determined selectably transmissive internally focused intermediate image lenses to block light transmission based upon the newly determined portion of the image to block or dim. The image augmentation processing flow 1800 then configures, at 1810, controllable light sources within an image augmenting window 1702 to generate the newly determined image portions to add to the image. The image augmentation processing flow 1800 then continues as described above.

Figure 13:
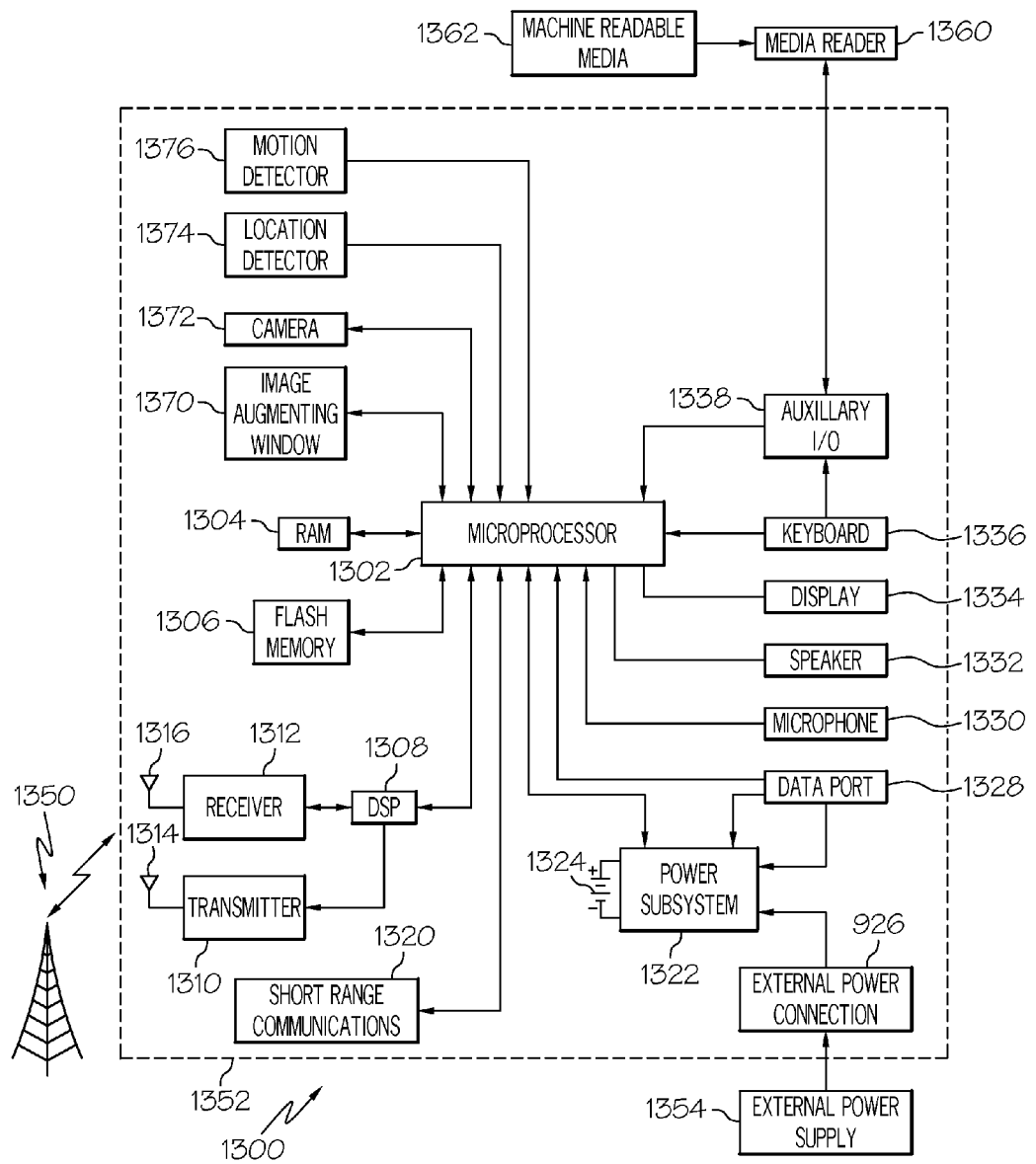
FIG. 13 is a block diagram of an electronic device and associated components in which the systems and methods disclosed herein may be implemented.

FIG. 13 is a block diagram of an electronic device and associated components 1300 in which the systems and methods disclosed herein may be implemented. In this example, an image augmenting window 1370, similar to the image augmenting window 1702 described above, is incorporated into a wireless communications device. In such an example, the wireless communications device is in communications with remote processing equipment and is able to receive specifications of enhancements or augmentations to be made to images of scenes observed through the image augmenting window 1370.

In this example, an electronic device 1352 is also a wireless two-way communication device with voice and data communication capabilities. Such electronic devices communicate with a wireless voice or data network 1350 using a suitable wireless communications protocol. Wireless voice communications are performed using either an analog or digital wireless communication channel. Data communications allow the electronic device 1352 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 1352 is an example electronic device that includes two-way wireless communications functions. Such electronic devices incorporate communication subsystem elements such as a wireless transmitter 1310, a wireless receiver 1312, and associated components such as one or more antenna elements 1314 and 1316. A digital signal processor (DSP) 1308 performs processing to extract data from received wireless signals and to generate signals to be transmitted. The particular design of the communication subsystem is dependent upon the communication network and associated wireless communications protocols with which the device is intended to operate.

The electronic device 1352 includes a microprocessor 1302 that controls the overall operation of the electronic device 1352. The microprocessor 1302 interacts with the above described communications subsystem elements and also interacts with other device subsystems such as flash memory 1306, random access memory (RAM) 1304, auxiliary input/output (I/O) device 1338, data port 1328, display 1334, keyboard 1336, speaker 1332, microphone 1330, a short-range communications subsystem 1320, a power subsystem 1322, location detectors 1374 and motion detectors 1376. In one example, a location detector is able to include one or more of a Global Positioning System (GPS), a magnetic field detector, or the like. A motion detector 1376 is able to include in one example one or more of a gyroscope, accelerometer, or the like.

One or more power storage or supply elements, such as a battery 1324, are connected to a power subsystem 1322 to provide power to the circuits of the electronic device 1352. The power subsystem 1322 includes power distribution circuitry for providing power to the electronic device 1352 and also contains battery charging circuitry to manage recharging the battery 1324 (or circuitry to replenish power to another power storage element). The power subsystem 1322 receives electrical power from external power supply 1354. The power subsystem 1322 is able to be connected to the external power supply 1354 through a dedicated external power connector (not shown) or through power connections within the data port 1328. The power subsystem 1322 includes a battery monitoring circuit that is operable to provide a status of one or more battery status indicators, such as remaining capacity, temperature, voltage, electrical current consumption, and the like, to various components of the electronic device 1352.

The image augmenting window 1370 is controlled by microprocessor 1302, such as according to the lens based optical window control process 800 and the image augmentation processing flow 1800, described above. The image augmenting window 1370 is able to be physically mounted within the electronic device 1352, or the image augmenting window 1370 is able to be separate from the electronic device 1352 and coupled to the electronic device by, for example, wired or wireless control connections. A camera 1372, which is equivalent to the camera 1749 described above, is able to capture images similar to those viewed by an observer through the image augmenting window 1370 and provide those images to the microprocessor 1302.

The data port 1328 is able to support data communications between the electronic device 1352 and other devices through various modes of data communications, such as high speed data transfers over an optical communications circuits. Data port 1328 is able to support communications with, for example, an external computer or other device. In some examples, the data port 1328 is able to include electrical power connections to provide externally provided electrical power to the electronic device 1352, deliver electrical power from the electronic device 1352 to other externally connected devices, or both. Data port 1328 of, for example, an electronic accessory is able to provide power to an electronic circuit, such as microprocessor 1302, and support exchanging data between the microprocessor 1302 and a remote electronic device that is connected through the data port 1328.

Data communication through data port 1328 enables a user to set preferences through the external device or through a software application and extends the capabilities of the device by enabling information or software exchange through direct connections between the electronic device 1352 and external data sources rather then via a wireless data communication network. In addition to data communication, the data port 1328 provides power to the power subsystem 1322 to charge the battery 1324 or to supply power to the electronic circuits, such as microprocessor 1302, of the electronic device 1352.

Operating system software used by the microprocessor 1302 is stored in flash memory 1306. Further examples are able to use a battery backed-up RAM or other non-volatile storage data elements to store operating systems, other executable programs, or both. The operating system software, device application software, or parts thereof, are able to be temporarily loaded into volatile data storage such as RAM 1304. Data received via wireless communication signals or through wired communications are also able to be stored to RAM 1304.

The microprocessor 1302, in addition to its operating system functions, is able to execute software applications on the electronic device 1352. A set of applications that control basic device operations, including at least data and voice communication applications, is able to be installed on the electronic device 1352 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 1352 through, for example, the wireless network 1350, an auxiliary I/O device 1338, Data port 1328, short-range communications subsystem 1320, or any combination of these interfaces. Such applications are then able to be installed by a user in the RAM 1304 or a non-volatile store for execution by the microprocessor 1302.

In a data communication mode, a received signal such as a text message or web page download is processed by the communication subsystem, including wireless receiver 1312 and wireless transmitter 1310, and communicated data is provided the microprocessor 1302, which is able to further process the received data for output to the display 1334, or alternatively, to an auxiliary I/O device 1338 or the Data port 1328. A user of the electronic device 1352 may also compose data items, such as e-mail messages, using the keyboard 1336, which is able to include a complete alphanumeric keyboard or a telephone-type keypad, in conjunction with the display 1334 and possibly an auxiliary I/O device 1338. Such composed items are then able to be transmitted over a communication network through the communication subsystem.

For voice communications, overall operation of the electronic device 1352 is substantially similar, except that received signals are generally provided to a speaker 1332 and signals for transmission are generally produced by a microphone 1330. Alternative voice or audio I/O subsystems, such as a voice message recording subsystem, may also be implemented on the electronic device 1352. Although voice or audio signal output is generally accomplished primarily through the speaker 1332, the display 1334 may also be used to provide an indication of the identity of a calling party, the duration of a voice call, or other voice call related information, for example.

Depending on conditions or statuses of the electronic device 1352, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 1320 provides for data communication between the electronic device 1352 and different systems or devices, which need not necessarily be similar devices. For example, the short-range communications subsystem 1320 includes an infrared device and associated circuits and components or a Radio Frequency based communication module such as one supporting Bluetooth® communications, to provide for communication with similarly-enabled systems and devices, including the data file transfer communications described above.

A media reader 1360 is able to be connected to an auxiliary I/O device 1338 to allow, for example, loading computer readable program code of a computer program product into the electronic device 1352 for storage into flash memory 1306. One example of a media reader 1360 is an optical drive such as a CD/DVD drive, which may be used to store data to and read data from a computer readable medium or storage product such as computer readable storage media 1362. Examples of suitable computer readable storage media include optical storage media such as a CD or DVD, magnetic media, or any other suitable data storage device. Media reader 1360 is alternatively able to be connected to the electronic device through the Data port 1328 or computer readable program code is alternatively able to be provided to the electronic device 1352 through the wireless network 1350.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which - when loaded in a computer system - is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. An image augmenting window, comprising:
   at least one internally focused intermediate image lens, each of the at least one internally focused intermediate image lens having a respective first side and a respective rear side, the respective first side being opposite the respective rear side, each of the at least one internally focused intermediate image lens respectively comprising:
      a first lens portion receiving incoming light through the first side and focusing the incoming light into a focused image on an internal focal plane within the respective internally focused intermediate image lens, the first lens portion comprising Gradient Index (GRIN) refractive material extending continuously from the first side to the internal focal plane; and
      a projecting output optical structure refracting the focused image as a projected image exiting the rear side at an exit angle;
   at least one controllable light source, wherein each controllable light source within the at least one controllable light source comprises a respective light source lens emitting a respective afocal projection of a respective projected light, the respective light source lens being separate from each internally focused intermediate image lens within the at least one internally focused intermediate image lens, and the respective light source lens being positioned adjacent to a lateral side of a respective internally focused intermediate image lens within the at least one internally focused intermediate image lens, each respective controllable light source within the at least one controllable light source further emitting a respective projected light that is parallel to a respective exit angle of the at least one internally focused intermediate image lens; and
   a controller configured to independently control each of the at least one controllable light source.

2. The image augmenting window of claim 1, each of the at least one controllable light source comprising:
   a respective light emitter; and
   a respective controllable shutter, and
   wherein the respective light source lens refracts light from the respective controllable shutter to emit a projection of the respective controllable shutter as the respective projected light.

3. The image augmenting window of claim 1, each of the at least one controllable light source comprising:
   a controllable light emitter, and
   wherein the respective light source lens refracts light from the respective controllable emitter to emit a projection of the respective controllable light emitter as the respective projected light.

4. The image augmenting window of claim 1, wherein the at least one internally focused intermediate image lens comprises a plurality of internally focused intermediate image lenses, and
   wherein the plurality of internally focused intermediate image lenses and the at least one controllable light source are arranged as a two-dimensional array.

5. The image augmenting window of claim 4, wherein the plurality of internally focused intermediate image lenses are arranged with each respective internal focal plane lying in a common focal plane, and
   wherein each of the at least one controllable light source comprises a respective light source creating a light image at a source focal plane, the source focal plane lying in the common focal plane.

6. The image augmenting window of claim 4, wherein the incoming light arrives at each respective first side with a respective incoming direction relative to a plane formed by the respective first side, and
   wherein the respective projecting output optical structure refracts the respective focused image through the respective rear side as light exiting the respective rear side with a respective exit direction that is parallel at the respective incoming direction.

7. The image augmenting window of claim 6, wherein the respective projecting output optical structure comprises a Gradient Index (GRIN) lens.

8. The image augmenting window of claim 4, wherein the at least one controllable light source comprises a plurality of controllable light sources, wherein each respective light source lens of each respective controllable light source is interleaved among the plurality of internally focused intermediate image lenses.

9. The image augmenting window of claim 8, wherein each controllable light source within the plurality of controllable light sources comprises a respective restricting aperture, the respective restricting aperture restricting an aperture of the respective projected light, each respective restricting aperture having an aperture size corresponding to a size of a human iris.

10. The image augmenting window of claim 1, wherein the at least one internally focused intermediate image lens comprises at least one selectably transmissive internally focused intermediate image lens, wherein each at least one internally focused intermediate image lens comprises one of the at least one selectably transmissive internally focused intermediate image lens,
   wherein each selectably transmissive internally focused intermediate image lens comprises at least one respective selectably transmissive shutter located in the internal focal plane, the respective selectably transmissive shutter controllable to block at least a portion of light passing therethrough, and the controller further configured to:
independently control each respective selectably transmissive shutter of each of the at least one selectably transmissive internally focused intermediate image lens;

determine a subset of the at least one selectably transmissive internally focused intermediate image lens that are to at least partially block transmission of light; and control the respective selectably transmissive shutters of the subset of the internally focused intermediate image lenses to at least partially block transmission of light therethrough.

11. The image augmenting window of claim 10, wherein each of the at least one respective selectably transmissive shutter comprises a Liquid Crystal cell.

12. The image augmenting window of claim 10, wherein the controller is further configured to:
determine a subset of controllable light sources within the at least one controllable light source that are to emit light to augment the focused image; and
control the respective controllable light sources of the subset of controllable light sources to emit light.

13. The image augmenting window of claim 10, wherein the controller is further configured to:
determine, subsequent to determining a subset of the at least one selectably transmissive internally focused intermediate image lens, a revised set of selectably transmissive internally focused intermediate image lens within the at least one selectably transmissive internally focused intermediate image lens that are to at least partially block transmission of light;
defining the revised set to be the subset of the at least one selectably transmissive internally focused intermediate image lens to at least partially block transmission of light; and
control, in response to determining the revised set, the respective selectably transmissive shutters of the subset of the at least one selectably transmissive internally focused intermediate image lens to at least partially block transmission of light therethrough.

14. The image augmenting window of claim 13, wherein the controller is further configured to:
determine a subset of controllable light sources within the at least one controllable light source that are to emit light to augment the focused image; and
control the respective controllable light sources of the subset of controllable light sources to emit light.
determine, subsequent to determining a subset of the controllable light sources, a revised subset of controllable light sources within the at least one controllable light source that are to emit light to augment the focused image;
control, in response to determining the revised subset of controllable light sources and in response to controlling the respective selectably transmissive shutters, the respective controllable light sources of the revised subset of controllable light sources to emit light.

15. The image augmenting window of claim 10, wherein each respective internally focused intermediate image lens comprises a respective array of selectably transmissive blocking shutters, each selectably transmissive blocking shutter within the respective array being located at different positions relative a center axis of the respective internally focused intermediate image lens, and wherein the controller determines one selectably transmissive blocking shutter within the respective array based upon an apparent distance at which the one selectably transmissive blocking shutter is to appear to an observer of the projected image.

16. A method of controlling an image augmenting window, the method comprising:
providing at least one selectably transmissive internally focused intermediate image lens, each of the at least one selectably transmissive internally focused intermediate image lens comprising:
a first lens portion receiving incoming light through a first side and focusing the incoming light into a focused image on an internal focal plane, the first lens portion comprising Gradient Index (GRIN) refractive material extending continuously from the first side to the internal focal plane;
a projecting output optical structure refracting the focused image as a projected image projected through a rear side that is opposite the first side; and
a selectably transmissive shutter located in the internal focal plane, the selectably transmissive shutter controllable to block at least a portion of light passing therethrough;
providing at least one controllable light source, wherein each controllable light source within the at least one controllable light source comprises a respective light source lens emitting a respective afocal projection of a respective projected light, the respective light source lens being separate from each internally focused intermediate image lens within the at least one internally focused intermediate image lens, and the respective light source lens being positioned adjacent to a lateral side of a respective selectably transmissive internally focused intermediate image lens within the at least one selectably transmissive internally focused intermediate image lens, each respective controllable light source within the at least one controllable light source further emitting a respective projected light that is parallel to the projected image of the respective selectably transmissive internally focused intermediate image lens; and
controlling, independently of each other, each selectably transmissive shutter of each of the at least one selectably transmissive intermediate image lens, the controller further configured to independently control each of the at least one controllable light source.

17. The method of claim 16,
wherein the at least one selectably transmissive internally focused intermediate image lens comprises a plurality of selectably transmissive internally focused intermediate image lenses, and
wherein the plurality of selectably transmissive internally focused intermediate image lenses and the at least one controllable light source are arranged as a two-dimensional array, the method further comprising:
determining a subset of the plurality of selectably transmissive internally focused intermediate image lens that are to at least partially block transmission of light; and
controlling the respective selectably transmissive shutters of the subset of the internally focused intermediate image lenses to at least partially block transmission of light therethrough.

18. The method of claim 17, further comprising:

determining a subset of controllable light sources within the at least one controllable light source that are to emit light to augment the focused image; and controlling the respective controllable light sources of the subset of controllable light sources to emit light.

19. The method of claim 17, further comprising:

determining, subsequent to determining a subset of the plurality of selectably transmissive internally focused intermediate image lens, a revised set of internally focused intermediate image lens within the plurality of internally focused intermediate image lens that are to at least partially block transmission of light;

defining the revised set to be the subset of the internally focused intermediate image lenses to at least partially block transmission of light; and controlling, in response to determining the revised set, the respective selectably transmissive shutters of the subset of the internally focused intermediate image lenses to at least partially block transmission of light therethrough.

20. The method of claim 19, further comprising:

determining a subset of controllable light sources within the at least one controllable light source that are to emit light to augment the focused image; and controlling the respective controllable light sources of the subset of controllable light sources to emit light.

determining, subsequent to determining a subset of the controllable light sources, a revised subset of controllable light sources within the at least one controllable light source that are to emit light to augment the focused image;

controlling, in response to determining the revised subset of controllable light sources and in response to controlling the respective selectably transmissive shutters, the respective controllable light sources of the revised subset of controllable light sources to emit light.

* * * * *